(12) United States Patent
Fennell

(10) Patent No.: US 10,477,927 B2
(45) Date of Patent: Nov. 19, 2019

(54) RFID ENHANCED FIXTURING APPARATUS

(71) Applicant: Michael P. Fennell, Alameda, CA (US)

(72) Inventor: Michael P. Fennell, Alameda, CA (US)

(*) Notice: Subject to any disclaimer, the term of this patent is extended or adjusted under 35 U.S.C. 154(b) by 96 days.

(21) Appl. No.: 15/889,999

(22) Filed: Feb. 6, 2018

(65) Prior Publication Data

US 2018/0168291 A1 Jun. 21, 2018

Related U.S. Application Data

(60) Continuation-in-part of application No. 15/169,443, filed on May 31, 2016, now Pat. No. 9,883,719.
(Continued)

(51) Int. Cl.
*F16L 3/233* (2006.01)
*A44B 18/00* (2006.01)
(Continued)

(52) U.S. Cl.
CPC .......... *A44B 18/0069* (2013.01); *A44B 11/02* (2013.01); *A44B 18/0003* (2013.01); *A44B 18/0061* (2013.01); *B65B 13/027* (2013.01); *F16B 5/0692* (2013.01); *F16B 5/07* (2013.01); *H02G 3/32* (2013.01); *F16B 2001/0028* (2013.01); *F16L 3/2336* (2013.01); *Y10T 24/10* (2015.01); *Y10T 24/14* (2015.01); *Y10T 24/141* (2015.01); *Y10T 24/1498* (2015.01); *Y10T 24/27* (2015.01); *Y10T 24/2708* (2015.01); *Y10T 24/2733* (2015.01); *Y10T 24/2767* (2015.01);
(Continued)

(58) Field of Classification Search
CPC ....... Y10T 24/10; Y10T 24/14; Y10T 24/141; Y10T 24/1498; Y10T 24/27; Y10T 24/2708; Y10T 24/2733; Y10T 24/2767; Y10T 24/2792; Y10T 24/40; Y10T 24/406; Y10T 24/4088; A44B 18/0069; A44B 18/0003; A44B 18/0061; A44B 11/02; B65B 13/027; F16B 5/0692; F16B 5/07; F16B 2001/0028; H02G 3/32; F16L 3/2336
See application file for complete search history.

(56) References Cited

U.S. PATENT DOCUMENTS 2,977,145 A 3/1961 Rifkin
3,214,816 A 11/1965 Mathison
(Continued)

FOREIGN PATENT DOCUMENTS

CH 682450 9/1993
JP 2001521771 11/2001
(Continued)

*Primary Examiner* — Robert Sandy
*Assistant Examiner* — Michael S Lee
(74) *Attorney, Agent, or Firm* — Quarles & Brady LLP; Gavin J. Milczarek-Desai

(57) ABSTRACT

A fixturing apparatus that includes a housing defining an interior space and having a trapezoidal cross-section, a first end, and an opposing second end, and is formed to include an aperture extending therethrough from the first end to said second end. The fixturing apparatus further comprises a flexible strap and a radio-frequency identification (RFID) chip to allow identifying and tracking the fixturing apparatus.

10 Claims, 28 Drawing Sheets

Related U.S. Application Data which is a division of application No. 14/143,819, filed on Dec. 30, 2013, now Pat. No. 9,351,541, which is a division of application No. 12/741,821, filed as application No. PCT/US2008/082685 on Nov. 6, 2008, now Pat. No. 8,615,854.

(60) Provisional application No. 60/985,881, filed on Nov. 6, 2007.

(51) Int. Cl.
  *B65B 13/02* (2006.01)
  *A44B 11/02* (2006.01)
  *F16B 5/06* (2006.01)
  *F16B 5/07* (2006.01)
  *F16B 1/00* (2006.01)
  *H02G 3/32* (2006.01)

(52) U.S. Cl.
  CPC ............ *Y10T 24/2792* (2015.01); *Y10T 24/34* (2015.01); *Y10T 24/40* (2015.01); *Y10T 24/406* (2015.01); *Y10T 24/4088* (2015.01); *Y10T 156/10* (2015.01)

(56) References Cited

U.S. PATENT DOCUMENTS

| | | | |
|---|---|---|---|
| 3,247,848 | A | 4/1966 | Mathison |
| 3,584,347 | A | 6/1971 | Verspieren |
| 3,823,443 | A | 7/1974 | Takabayashi |
| 3,824,654 | A | 7/1974 | Takabayashi |
| 3,900,923 | A | 8/1975 | Thomas |
| 3,931,383 | A | 1/1976 | Bakermans |
| 4,008,512 | A | 2/1977 | Prodel |
| 4,154,418 | A | 5/1979 | Wiese |
| 4,393,548 | A | 7/1983 | Herb |
| 4,557,023 | A | 12/1985 | Six et al. |
| 4,680,834 | A | 7/1987 | Andre et al. |
| 4,680,838 | A | 7/1987 | Astl |
| 4,854,015 | A | 8/1989 | Shaull |
| 4,879,854 | A | 11/1989 | Handler |
| 4,882,813 | A | 11/1989 | Nakamura |
| 4,908,911 | A | 3/1990 | Bretti et al. |
| 5,201,100 | A | 4/1993 | Cardinale |
| 5,419,744 | A | 5/1995 | Kagebeck |
| 5,664,294 | A | 9/1997 | Sorensen et al. |
| 5,755,016 | A | 5/1998 | Provost |
| 6,131,249 | A | 10/2000 | Suenaga |
| 6,478,784 | B1 | 11/2002 | Johnson et al. |
| 6,668,429 | B2 | 12/2003 | Fujisawa et al. |
| 7,263,745 | B2 | 9/2007 | Mori |
| 7,478,460 | B2 | 1/2009 | Gallant et al. |
| 7,730,592 | B2 | 6/2010 | Krisel |
| 2003/0182771 | A1 | 10/2003 | Hooksett et al. |
| 2005/0183248 | A1 | 8/2005 | Gallant et al. |
| 2005/0186387 | A1* | 8/2005 | Gallant .................. B29C 43/222 428/100 |
| 2007/0054538 | A1 | 3/2007 | Smith et al. |
| 2010/0239865 | A1* | 9/2010 | Kallinen ................ B29C 70/46 428/411.1 |
| 2010/0292552 | A1* | 11/2010 | Say ..................... A61B 5/14532 600/347 |
| 2013/0283572 | A1* | 10/2013 | Hiroki .............. G06K 19/07762 24/16 PB |
| 2015/0154433 | A1 | 6/2015 | Stewart |
| 2018/0080580 | A1* | 3/2018 | Coulter .................... H02G 3/32 |

FOREIGN PATENT DOCUMENTS

| | | |
|---|---|---|
| JP | 2002529123 | 9/2002 |
| WO | 2009061957 | 5/2009 |

\* cited by examiner

700

RFID ENHANCED FIXTURING APPARATUS

CROSS-REFERENCE TO RELATED APPLICATIONS

This Application is a Continuation-in-Part of U.S. Divisional patent application having Ser. No. 15/169,443, filed on May 31, 2016, which is a Divisional of U.S. patent application having Ser. No. 14/143,819, filed on Dec. 30, 2013, now U.S. Pat. No. 9,351,541, which is a Divisional of U.S. Non-Provisional patent application having Ser. No. 12/741,821, filed on Sep. 13, 2010, now U.S. Pat. No. 8,615,854, which is a National Stage entry of International Application No. PCT/US2008/082685 filed on Nov. 6, 2008, which claimed the benefit of and priority to a U.S. Provisional Patent Application having Ser. No. 60/985,881 filed Nov. 6, 2007, the contents of which are incorporated by reference herein in their entirety.

TECHNICAL FIELD

This technology disclosure relates to a fixturing apparatus and to a method to form that fixturing apparatus. In certain embodiments, the invention relates to a fixturing apparatus for cables.

BACKGROUND

It is known in the art to releaseably attach a first surface to a second surface by disposing a plurality of flexible loop-type fasteners on one of the surfaces and a plurality of flexible hook-type fasteners on the other surface. When mated, the plurality of flexible hook-type fasteners engage with the plurality of flexible loop-type fasteners to releaseably secure the first surface to the second surface.

In industries, such as telecommunication, electronics, filming and broadcasting, etc., organization of cables by various types of fasteners and ties is important. Being able to reliably and quickly identify, track, and sort cables is also important in these industries. For example, tens of thousands of cables are utilized daily in the filming and broadcasting industry. Different equipment requires different types of cables. Workers at professional camera and lighting rental facilities, motion picture studios, sporting and music events and broadcast stations uncoil and recoil many different types of cables daily. Many times, some of those cables are very expansive. Therefore, it is essential to have an effective system to identify, track, and sort cables.

BRIEF DESCRIPTION OF THE DRAWINGS

The disclosure will be better understood from a reading of the following detailed description taken in conjunction with the drawings in which like reference designators are used to designate like elements, and in which.

DETAILED DESCRIPTION

This disclosure is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the invention.

Figure 1:
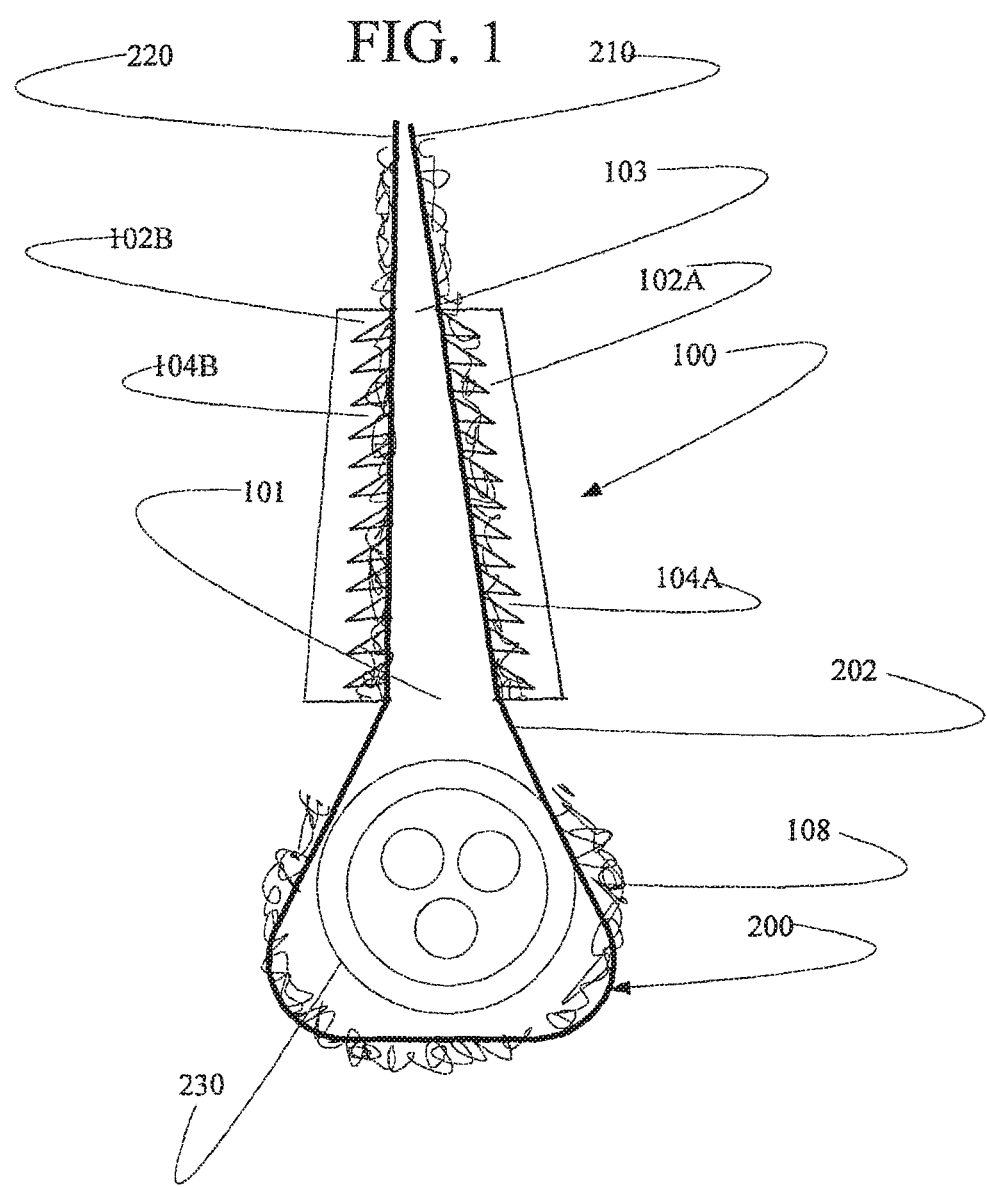
FIG. 1 illustrates Applicant's fixturing apparatus 100.
Figure 2:
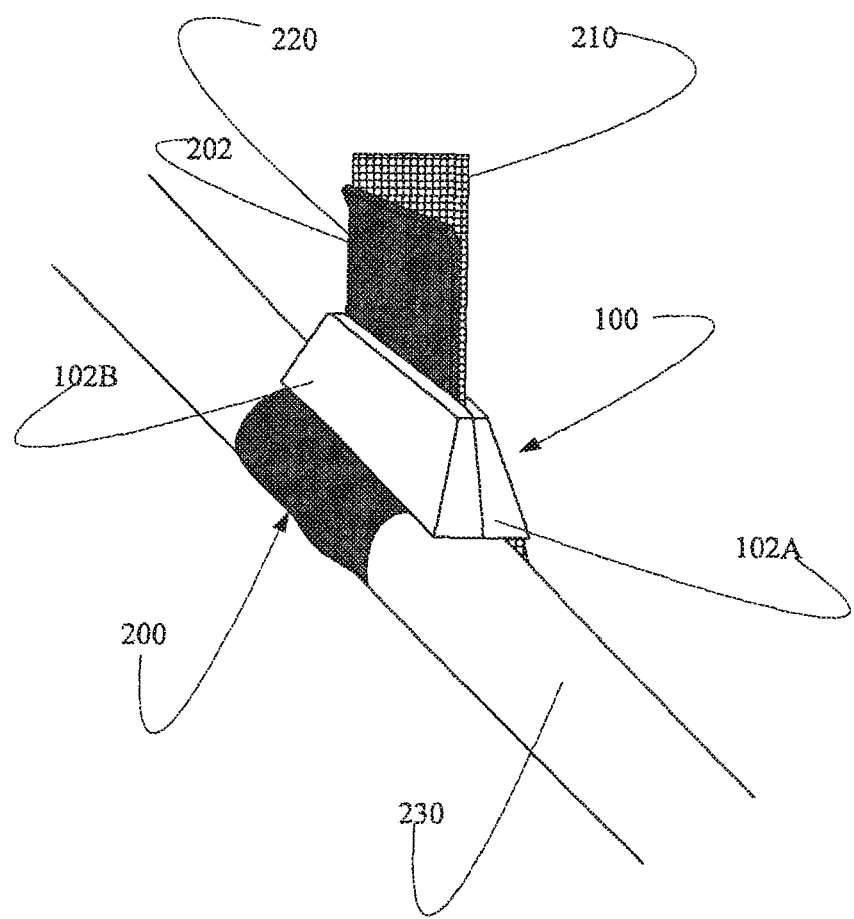
FIG. 2 illustrates a perspective view of Applicant's fixturing apparatus.

Referring now to FIGS. 1 and 2, fixturing apparatus 100 comprises a housing comprising a subassembly 102A and a subassembly 102B, and is formed to include an aperture 106 extending therethrough. In the illustrated embodiment of FIG. 1, a flexible strap 200 is disposed partially around a cable 230, wherein a first end 210 of flexible strap 200 has been inserted into a first end 101 of aperture 106, moved through aperture 106, and moved outwardly through a second end 103 of aperture 106. Similarly, a second end 220 of flexible strap 200 has been inserted into a first end 101 aperture 106, moved through aperture 106, and moved outwardly through a second end 103 of aperture 106.

In the illustrated embodiment of FIG. 1, a first plurality of rigid locking teeth 104A are formed in subassembly 102A, and second plurality of rigid locking teeth 104B are formed in subassembly 102B.

FIG. 2 illustrates a perspective view of fixturing assembly 100, flexible strap 200, and cable 230.

Figure 3A:
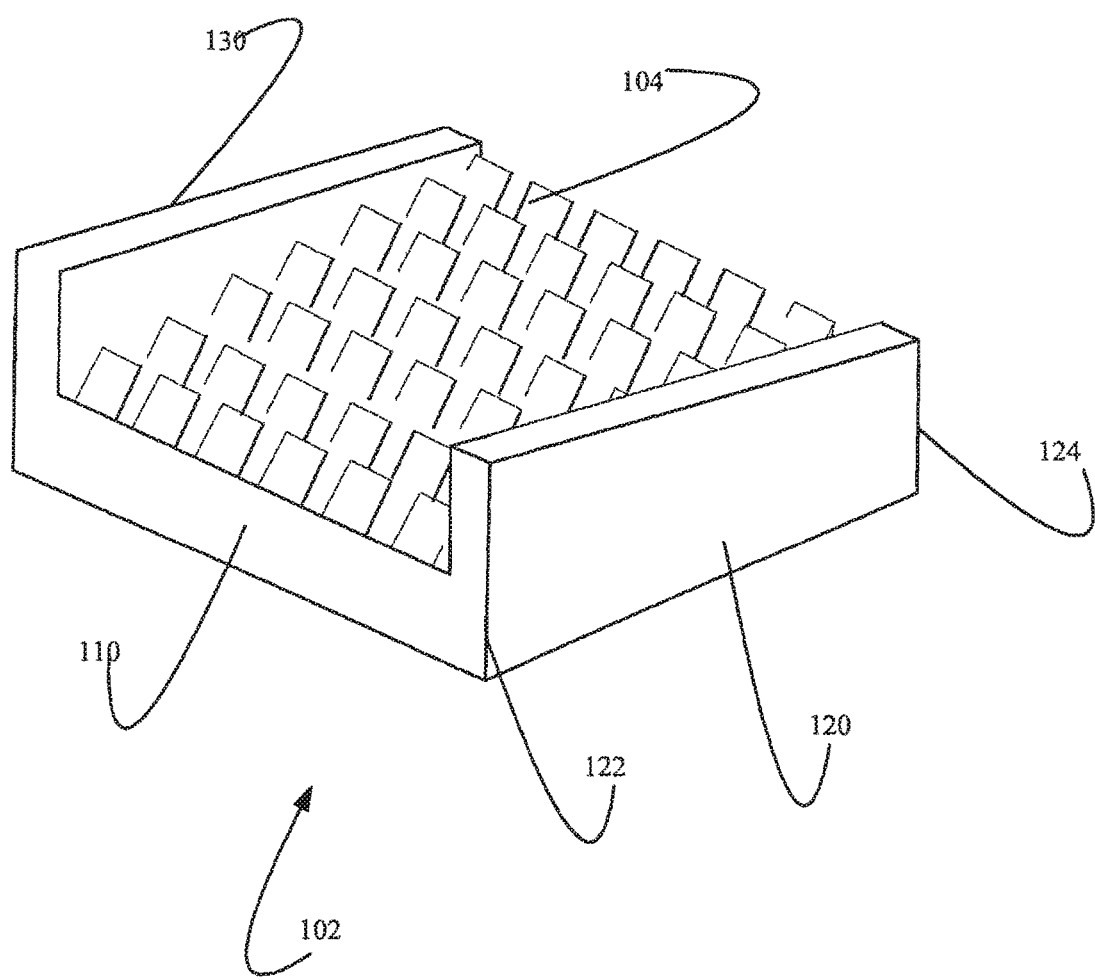
FIG. 3A illustrates a subassembly used to form the fixturing apparatus of FIG. 1.
Figure 3B:
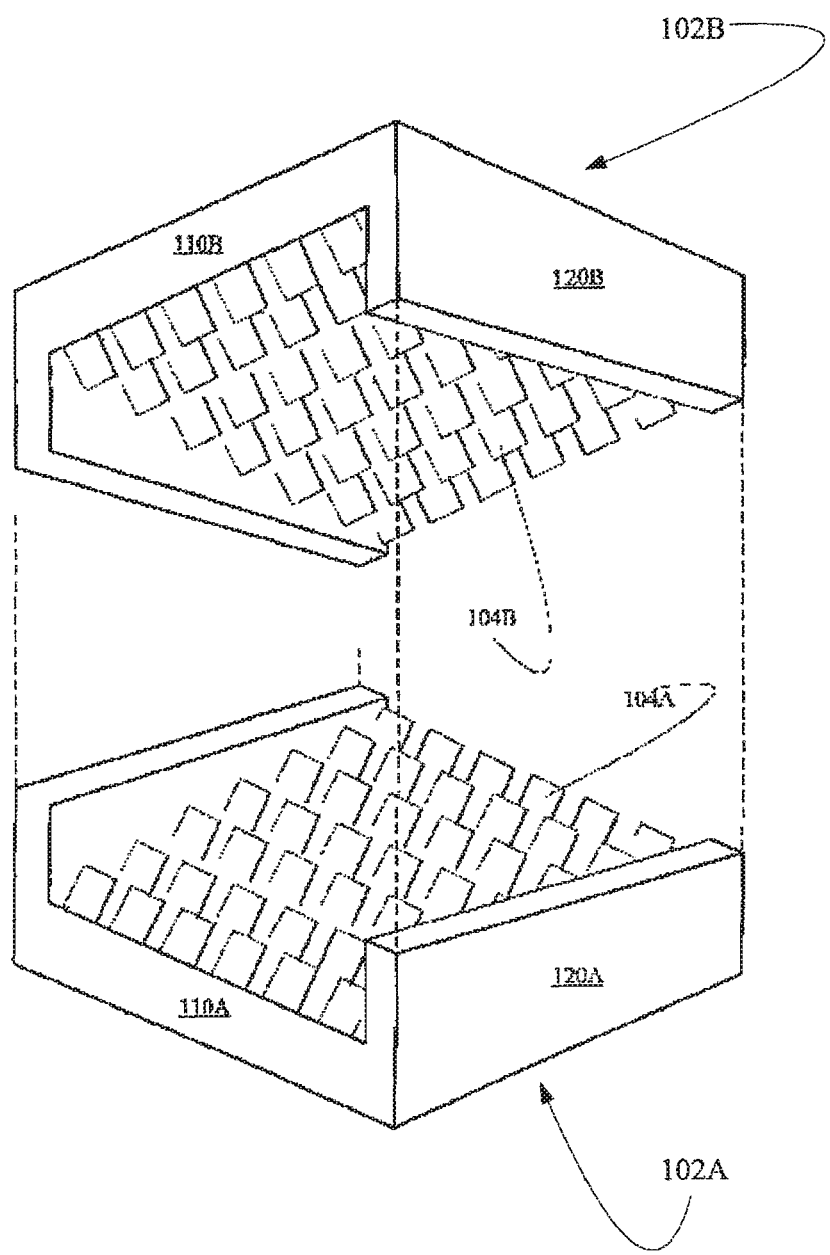
FIG. 3B illustrates two of the subassemblies of FIG. 3A being attached to one another to form the fixturing apparatus of FIG. 1.
Figure 3C:
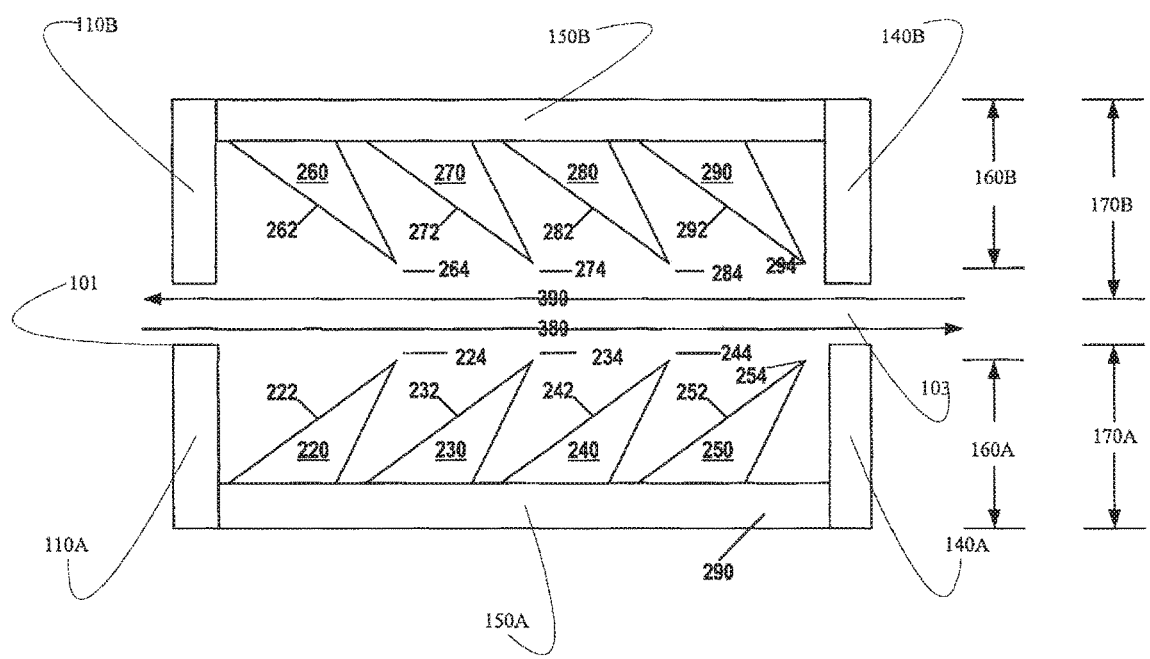
FIG. 3C is a cross-sectional view of the fixturing apparatus of FIG. 1.

Referring to FIGS. 3A, 3B, and 3C, each subassembly 102 comprises a U-shaped housing comprising a first lip 110, an opposing second lip 140. Each subassembly 110 further comprises a first side wall 120 interconnecting a first end of first lip 110 and a first end of second lip 140, and a second side wall 130 interconnecting a second end of first lip 110 and a second end of second lip 140. A bottom 150 interconnects from lip 110, read lip 140, first side 120, and second side 130. A plurality of locking teeth 104 extend outwardly from bottom 150.

Side wall 120 and side wall 130 each comprises a height 122 (FIG. 3A) where side wall 120 and side wall 130 each connect to first lip 110, and a height 124 (FIG. 3A) where side wall 120 and side wall 130 each connect to second lip 140. In certain embodiments, height 122 is greater than height 124. In these embodiments, side walls 120 and 130 comprise a trapezoidal shape.

In certain embodiments, side wall 120, first lip 110, side wall 130, and second lip 140, are integrally formed by, for example, injection molding. In certain embodiments, side wall 120, first lip 110, side wall 130, second lip 140, bottom 150, and the plurality of locking teeth 104, are integrally formed by, for example, injection molding.

Each first lip and each second lip are formed to have a height 170. Each of the plurality of locking teeth 104 are formed to have a height 160. In certain embodiments, height 170 is greater than height 160. In certain embodiments, height 160 is greater than height 170.

In certain embodiments, the plurality of rigid locking teeth are formed from one or more metals. In certain embodiments, the plurality of rigid locking teeth are formed from one or more ceramic materials. In certain embodiments, the plurality of rigid locking teeth are formed from a polymeric material selected from a group consisting of nylon, polyamide, polyimide, polyamideimide, polyurethane, polyethylene, polypropylene, polycarbonate, polystyrene, and combinations thereof. In certain embodiments, fixturing subassembly 102 is formed as an integral unit from a polymeric material selected from the group consisting of nylon, polyamide, polyimide, polyamideimide, polyurethane, polyethylene, polypropylene, polycarbonate, polystyrene, and combinations thereof.

FIG. 3C is a cross-sectional view of the fixturing apparatus 100, and shows a first plurality of rigid locking teeth 220, 230, 240, and 250, disposed on bottom portion 150A of first subassembly 102A. Rigid locking tooth 220 is formed to include a sloping side portion 222, and a gripping edge 224. Similarly, rigid locking teeth 230, 240, and 250, are formed to include sloping side portions 232, 242, and 252, respectively. Rigid locking teeth 220, 230, 240, and 250, are further formed to include gripping edges 224, 234, 244, and 254, respectively.

FIG. 3C further shows a second plurality of rigid locking teeth 260, 270, 280, and 290, disposed on bottom portion 150B of second subassembly 102B. Rigid locking teeth 260, 270, 280, and 290, are formed to include sloping side portions 262, 272, 282, and 292, respectively. Rigid locking teeth 260, 270, 280, and 290, are further formed to include gripping edges 264, 274, 284, and 294, respectively.

A fabric material, such as for example and without limitation, flexible strap 200, will slide across rigid locking teeth 220, 230, 240, 250, 260, 270, 280, and 290 in the non-fixturing direction 380, wherein that fabric moves across the sloping side portion of a rigid locking tooth before contacting the gripping edge of that rigid locking tooth. A fabric material will not, however, slide across rigid locking teeth 220, 230, 240, 250, 260, 270, 280, and 290, in the opposite, or fixturing direction 390. Rather when a force is applied to the fabric along the fixturing direction 390, portions of the fabric will engage gripping edges 224, 234, 244, 254, 264, 274, 284, and 294, thereby preventing movement of the fabric along the fixturing direction.

In embodiments wherein the fabric material comprises a plurality of flexible loop-type fasteners disposed on a surface in contact with locking teeth gripping edges 224, 234, 244, and 254, the gripping edges engage those flexible loop-type fasteners thereby preventing movement of the fabric in the fixturing direction. Similarly, in embodiments wherein the fabric material comprises a plurality of flexible loop-type fasteners disposed on a surface in contact with locking teeth gripping edges 264, 274, 284, and 294, the gripping edges engage those flexible loop-type fasteners thereby preventing movement of the fabric in the fixturing direction.

Referring now to FIG. 3B, Applicant's fixturing apparatus 100 is formed by attaching a top of a side wall 120A of a first fixturing subassembly 102A to a top of a side wall 130B of a second fixturing subassembly 102B, and by attaching a top of a side wall 130A of the first fixturing subassembly 102A to a top of a side wall 120B of the second fixturing subassembly 102B. Height 122 of a first end of side walls 120 and 130 is greater than both height 160 of the plurality of locking teeth and height 170 of first and second lip 110 and 140, respectively. In addition, height 124 of a second end of side walls 120 and 130 is greater than both height 160 of the plurality of locking teeth and height 170 of first and second lip 110 and 140, respectively. As a result, when assembly 102 A is attached to assembly 102B an aperture 106 (FIG. 1) is formed and extends from a first end defined by first lip 110A and 110B through the fixturing apparatus 100 and to a second end defined by second lip 140A and 140B.

In certain embodiments, Applicant's fixturing apparatus 100 comprises a trapezoidal cross-section, a first side, and an opposing second side, and is formed to include an aperture 106 (FIG. 1) extending therethrough from the first side to the second side. In certain embodiments, the aperture is defined by four walls.

An end of a flexible strap 200 can be inserted into a first end 101 of the aperture 106, and moved in a first direction through said aperture and outwardly therefrom through a second end 103 of the aperture 106. After insertion in and through the aperture in the first direction, the flexible strap cannot be moved-backwardly through the aperture in a second and 180 degree opposite direction.

In certain embodiments, flexible strap 200 comprises a fabric. By "fabric," Applicant means a flexible material formed by weaving or felting or knitting or crocheting natural and/or synthetic fibers. In certain embodiments, flexible strap 200 comprises a nylon fabric. In certain embodiments, flexible strap 200 comprises a cotton or polyester fabric.

In the illustrated embodiment of FIG. 2, a plurality of flexible loop-type fasteners 108 (FIG. 1) disposed on surface 202, such that the plurality of loop-type fasteners 108 are in contact with both the first plurality of locking teeth 104A and the second plurality of locking teeth 104B. Applicant has found that fixturing is extremely strong when the flexible strap 200 is confined to an enclosed channel, such as aperture 106, extending through fixturing apparatus 100.

Figure 10A:
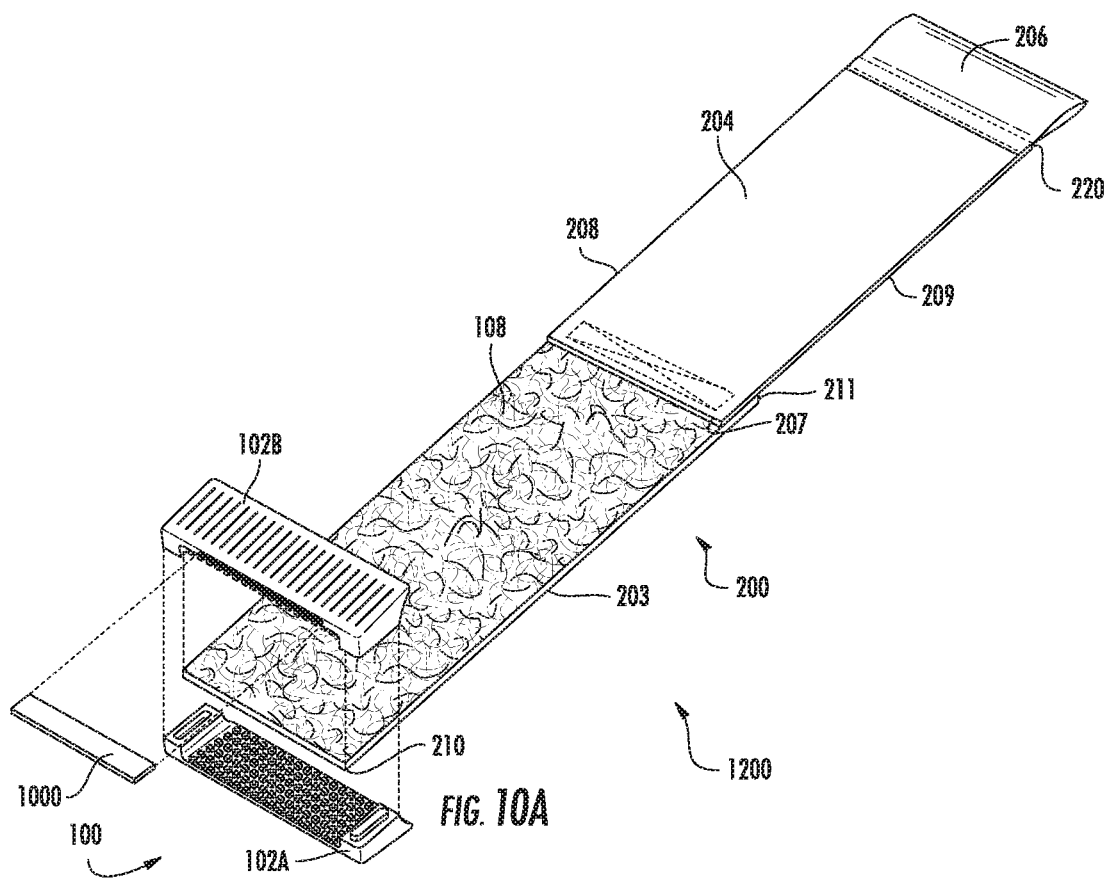
FIGS. 10A-10C illustrate an embodiment of a radio-frequency identification (RFID) enhanced apparatus.
Figure 10B:
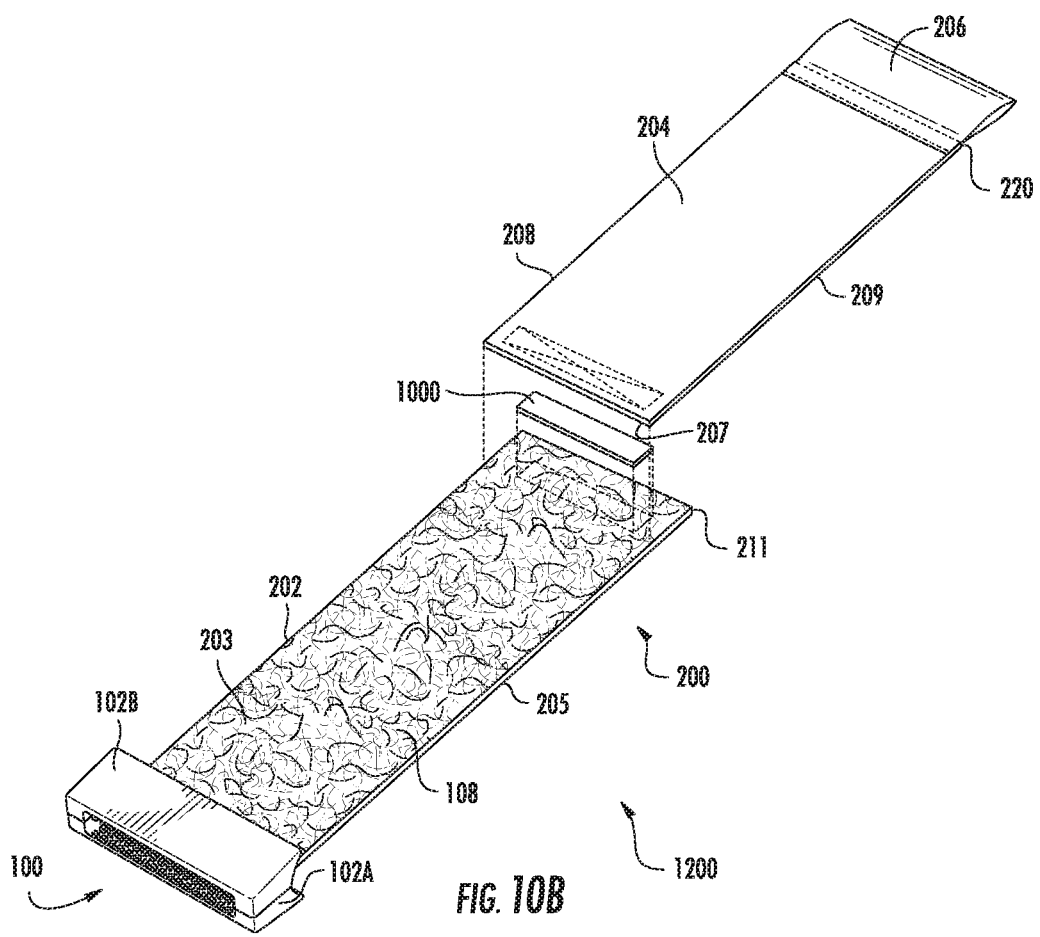
Figure 10C:
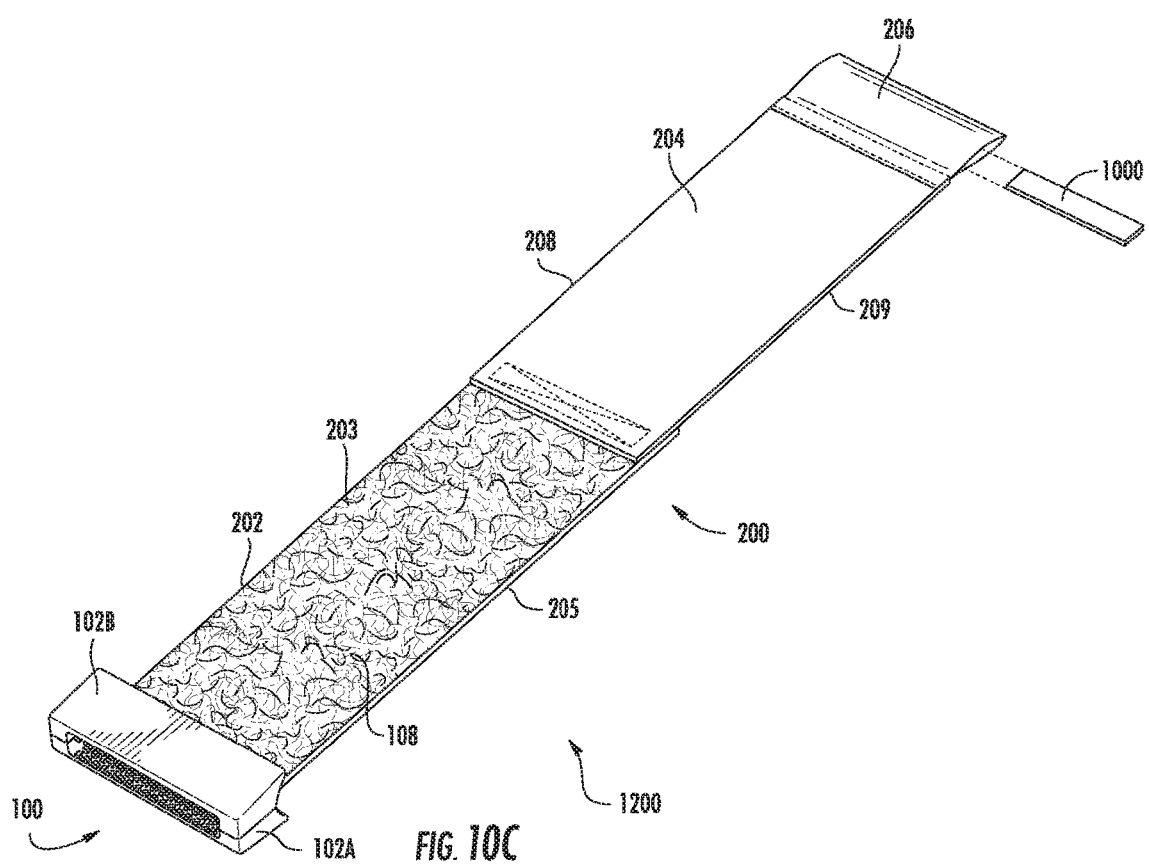

In the illustrated embodiment of FIGS. 10A-10C, flexible strap 200 further comprises a first segment 203, a second segment 204, and a pull tag 206. Further, the first segment 203 comprises a first end 210, an opposing second end 211, a first surface 202, and an opposing second surface 205. Similarly, the second segment 204 comprises a first end 207, an opposing second end 220, a first surface 208, and an opposing surface 209. In this embodiment, the first segment 203 is attached to the second segment 204 via the second end 211 of the first segment 203 and the first end 207 of the second segment 204. For example and without limitation, the ends of segments 203 and 204 are attached together by adhesives, sewing, stitching, ultrasonic welding, and other known methods in the art.

Further, in the illustrated embodiments of FIGS. 10A-10C, the first end 210 of the flexible strap 200 is attached to the subassembly 102B. The plurality of flexible loop-type fasteners 108 are disposed on the first surface 202 of the first segment 203. The second surface 205 of the first segment 203 and the first surface 208 of the second surface 204 do not have any flexible loop-type fasteners. Moreover, in some embodiments, a second type of flexible loop-type fasteners are disposed on the second surface 209 of the second segment 204. This second type of flexible loop-type fasteners are different from the flexible loop-type fasteners 108. When a user loops the pull tag 206 through the aperture 106 (FIG. 1), the second type of flexible loop-type fasteners cannot engage with the gripping edges of the locking teeth to prevent the movement of the flexible strap 200. When the second segment 204 is pulled through the aperture 106 and the first segment 203 is entering through the aperture 106, the surface 202 where the plurality of loop-type fasteners 108 are disposed will be engaged with the gripping edges of the locking teeth, preventing movement of the flexible strap 200 in a 180 degree opposite direction. The second type of flexible loop-type fasteners on surface 209 can releasably attach to the flexible loop-type fasteners 108 on surface 202.

In certain embodiments, first end 210 of flexible strap 200 can be inserted into first end 101 (FIGS. 2B, 2C) of aperture 106 (FIG. 1), and moved in direction 380 (FIG. 3C) through aperture 106 and outwardly through second end 103 (FIGS. 2B, 2C) of aperture 106 (FIG. 1). After insertion in and through aperture 106 (FIG. 1) in first direction 380 (FIG. 3C), first end 210 cannot be moved-backwardly through aperture 106 in second direction 390 (FIG. 3C).

In certain embodiments, second end 220 of flexible strap 210 can be inserted into the first end 101 (FIGS. 2B, 2C) of aperture 106 (FIG. 1), and moved in direction 380 (FIG. 3C) through aperture 106 and outwardly through second end 103 (FIGS. 2B, 2C) of aperture 106 (FIG. 1). After insertion in and through aperture 106 (FIG. 1) in first direction 380 (FIG. 3C), flexible second end 220 cannot be moved-backwardly through aperture 106 in second direction 390 (FIG. 3C).

In certain embodiments, one or more of Applicant's rigid locking teeth comprises a rectangular base, a first rectangular surface attached to a first end of said rectangular base and extending outwardly therefrom, and a second rectangular surface attached to an opposing end of said rectangular base and extending outwardly therefrom, wherein a first rectangular surface distal end is attached to a said second rectangular surface distal end to form a gripping edge. For example and referring now to FIG. 3D, in certain embodiments Applicant's fixturing apparatus comprises one or more locking teeth 300. Rigid locking tooth 300 comprises a first embodiment of a five-sided structure.

Figure 3D:
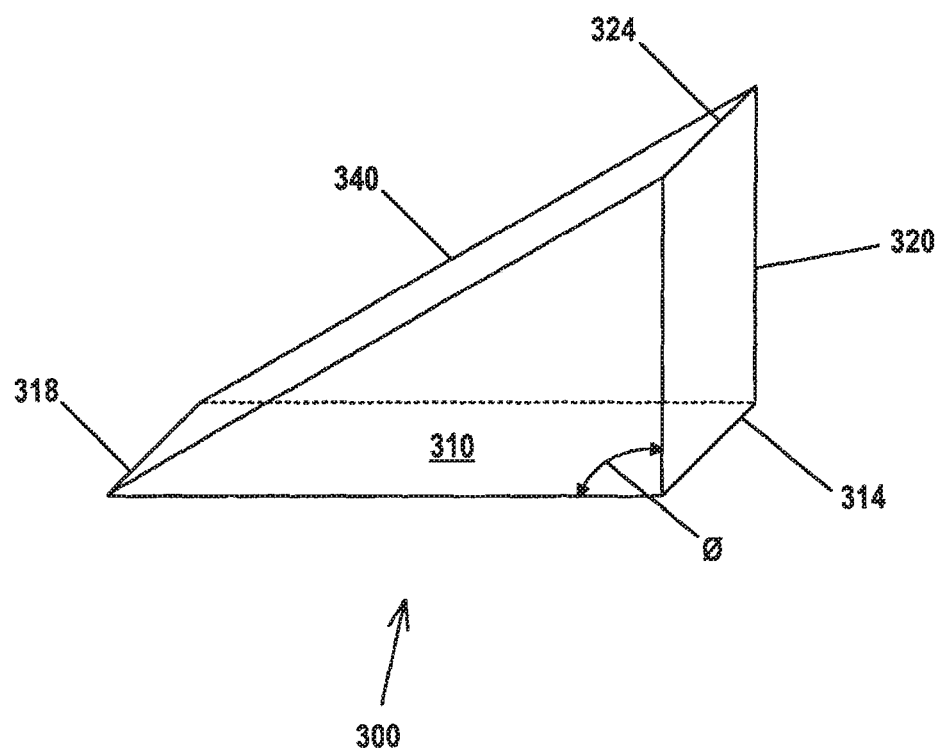
FIG. 3D shows a first embodiment of Applicant's rigid locking tooth.
Figure 3E:
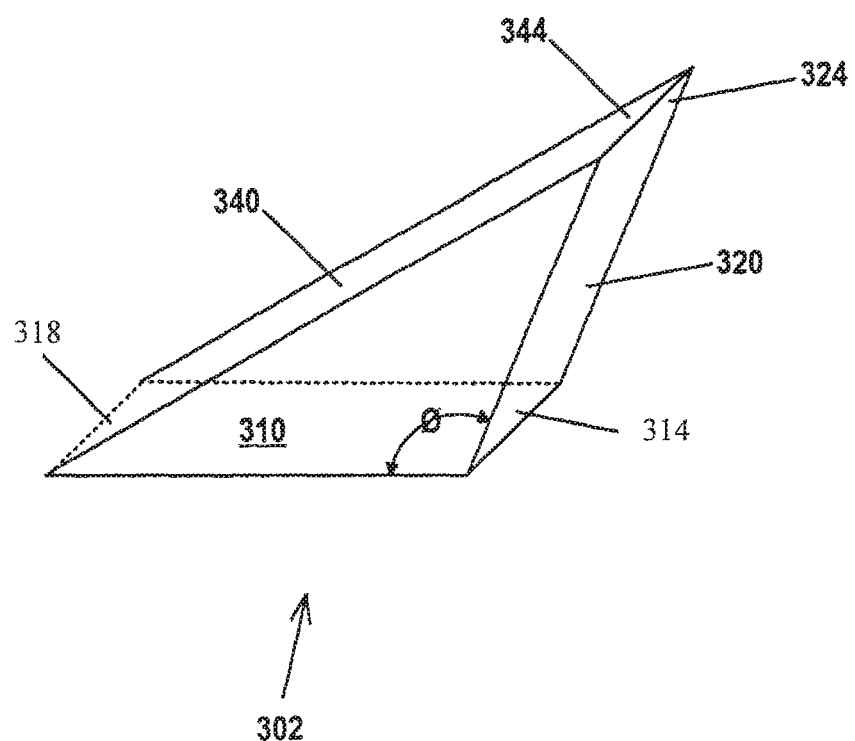
FIG. 3E shows a second embodiment of Applicant's rigid locking tooth.

Referring now to FIG. 3E, in certain embodiments Applicant's fixturing apparatus comprises one or more locking teeth 302. Rigid locking tooth 302 comprises a second embodiment of a five-sided structure.

Rigid locking teeth 300 and 302 comprise a rectangular base 310, a first rectangular surface 320 attached to a first end 314 of rectangular base 310 and extending outwardly therefrom, a second rectangular surface 340 attached to a second end 318 of rectangular base 310 and extending outwardly therefrom, wherein a first rectangular surface distal end is attached to a said second rectangular surface distal end to form a gripping edge 324.

With respect to rigid locking tooth 300, the first rectangular surface 320 in combination with rectangular base 310 define an internal dihedral angle of about 90 degrees. With respect to rigid locking tooth 302, the first rectangular surface 320 in combination with rectangular base 310 define an internal dihedral angle $\Phi$ greater than 90 degrees. In certain embodiments, $\Phi$ is about 110 degrees. In certain embodiments, $\Phi$ is about 120 degrees.

Figure 3F:
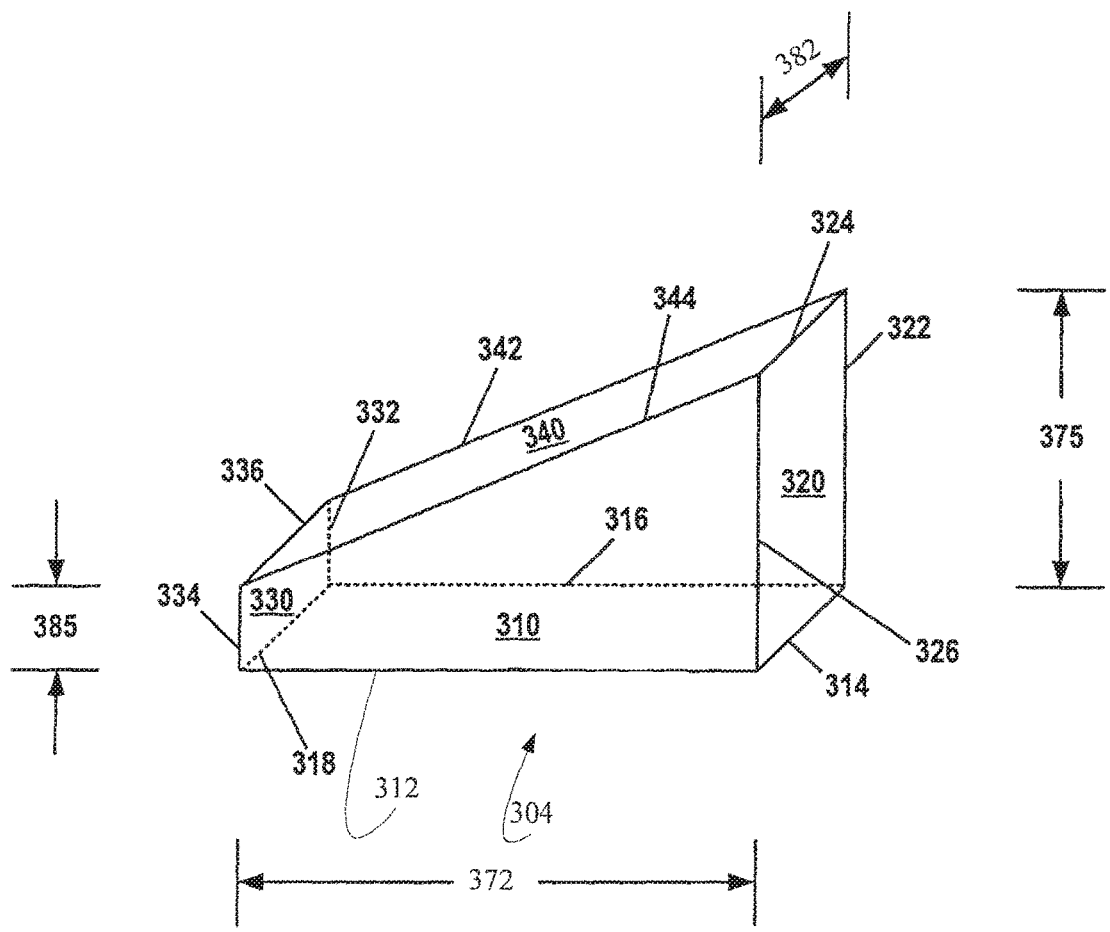
FIG. 3F shows a third embodiment of Applicant's rigid locking tooth.

Referring now to FIG. 3F, in certain embodiments Applicant's fixturing apparatus comprises one or more rigid locking teeth 304. Rigid locking tooth 304 comprises a first embodiment of a six-sided structure. Referring now to FIG. 3H, in certain embodiments Applicant's fixturing apparatus comprises one or more locking teeth 306. Rigid locking tooth 306 comprises a second embodiment of a six-sided structure.

In certain embodiments, Applicant's fixturing apparatus comprises zero or more rigid locking teeth 300, in combination with zero or more rigid locking teeth 302, in combination with zero or more rigid locking teeth 304, in combination with zero or more rigid locking teeth 306.

FIG. 3F shows Applicant's rigid locking tooth 304. The lengths, widths, heights, and axes, described with respect to rigid locking tooth 304 also apply to rigid locking teeth 300, 302, and 306. Base 310 comprises a rectangular shape defined by sides 312, 314, 316, and 318. Base 310 comprises a length 372 and a width 382. In certain embodiments, length 372 is between about 0.0002 mm and about 5.0 mm. In certain embodiments, width 382 is between about 0.0001 mm and about 2.5 mm.

Rectangular-shaped side 320, defined by sides 314, 322, 324, and 326, is attached to edge 314 of base 310 and extends upwardly therefrom. In the illustrated embodiment of FIG. 3A, side 320 and base 310 intersect to form a dihedral angle of about ninety degrees (90°). Side 320 comprises a height 375 and width 382.

In certain embodiments, height 375 is between about 0.0001 mm and about 5 mm. In certain embodiments, height 375 is about 0.0001 mm. In certain embodiments, height 375 is about 0.001 mm. In certain embodiments, height 375 is about 0.01 mm. In certain embodiments, height 375 is about 0.1 mm. In certain embodiments, height 375 is about 1 mm.

Rectangular-shaped side 330, defined by sides 318, 332, 334, and 336, is attached to edge 318 of base 310, and extends upwardly therefrom. In the illustrated embodiment of FIG. 3F, side 330 and base 310 intersect to form a dihedral angle of about ninety degrees (90°). Side 330 comprises a height 385 and width 382. In certain embodiments, height 385 is between about 0 mm and about 2.0 mm.

As those skilled in the art will appreciate, where height 385 is 0 mm, rigid locking tooth 304 becomes rigid locking tooth 300. Where height 385 is 0 mm, sides 336 and 318 are the same, and top portion 340 intersects with base portion 310. The dimensions and axes described in FIGS. 3A through 3B are applicable to both rigid locking tooth 300 and rigid locking tooth 305.

Sides 320 and 330 have a facing relationship, wherein height 320 is greater than height 330. In certain embodiments wherein height 385 is greater than 0, the ratio of height 375 to height 385 is between about 2:1 to about 6:1.

Top 340 comprises a rectangular shape, and is defined by sides 324, 342, 336, and 344. Top 340 comprises width 382. Referring now to FIGS. 3A and 3D, side 350 comprises a quadrilateral shape with two parallel sides 326 and 334, and is defined by sides 312, 326, 334, and 344. Referring now to FIGS. 3A and 3E, side 360 comprises a quadrilateral shape with two parallel sides 322 and 332, and is defined by sides 316, 322, 332, and 342.

Figure 3G:
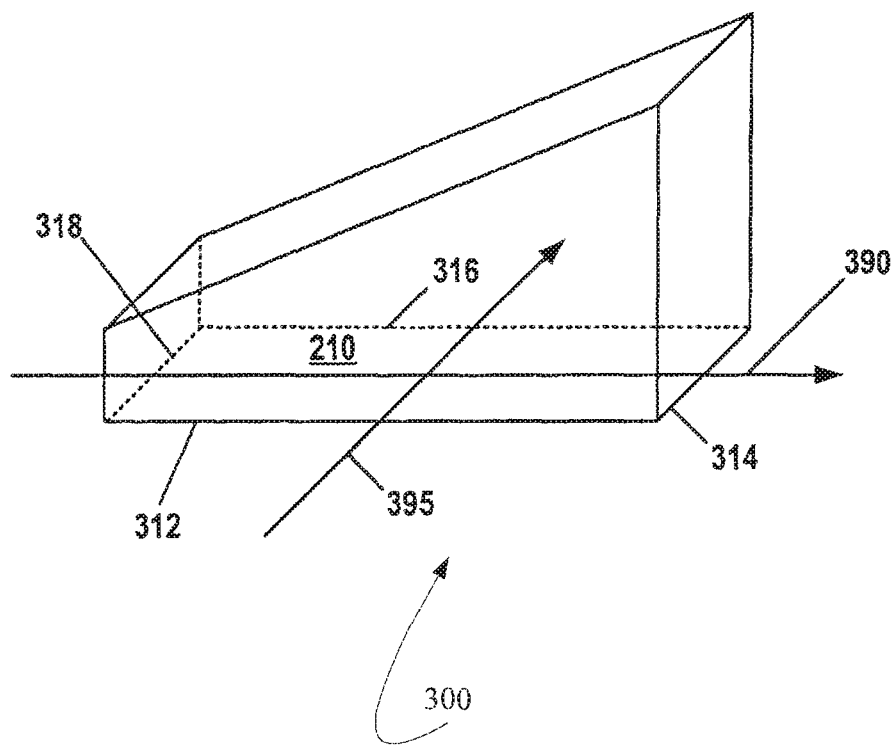
FIG. 3G shows a second perspective view of the rigid locking tooth of FIG. 3F.
Figure 3H:
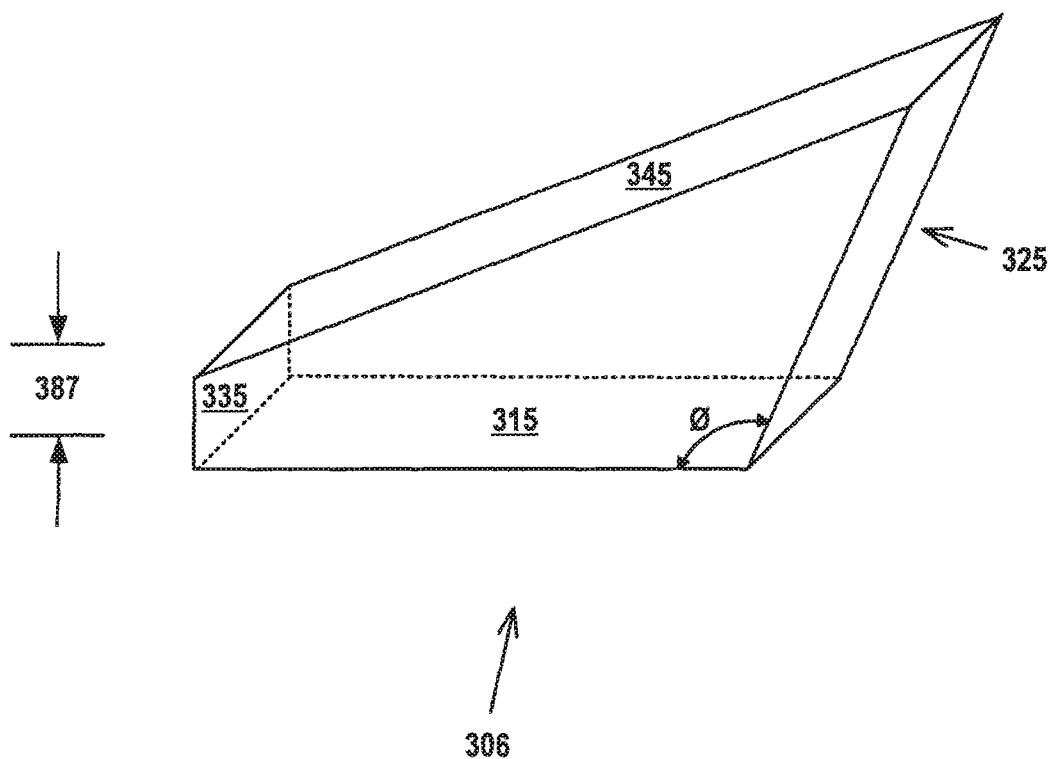
FIG. 3H shows a fourth embodiment of Applicant's rigid locking tooth.

Referring now to FIG. 3G, rigid locking tooth 300 comprises a long axis 390 comprising a first center line of base 210, wherein that long axis 390 is parallel to long sides 312 and 316 and bisects short sides 314 and 318. Rigid locking tooth 300 further comprises short axis 395 comprising a second center line of base 210, wherein that short axis 395 is parallel to short sides 314 and 318 bisects long sides 312 and 316.

FIGS. 3E and 3H illustrate Applicant's rigid locking teeth 302 and 306.

As a general matter, individual rigid locking teeth disposed in any given plurality of rigid locking teeth 104 are arranged in a pattern of columns and rows. In various embodiments of Applicant's invention, the orientations of individual rigid locking teeth disposed in such columns and rows differ. These various orientations are described herein with reference to the relationship of the long axes 390 (FIG. 3G) and short axes 395 (FIG. 3G) of adjacent rigid locking teeth in the same column, and the relationship of the long axes 390 and short axes 395 of adjacent rigid locking teeth in the same row.

References herein to axes being "aligned" mean that those axes are coaxial and/or parallel, i.e. overlap one another. Axes described herein as not being aligned are not coaxial, i.e. do not overlap. In orientations 400 (FIG. 4A) and 700 (FIG. 7A), the long axes of adjacent rigid locking teeth disposed in the same column are aligned. In orientations 500, 600, 800, and 900, the long axes of adjacent rigid locking teeth disposed in the same column are not aligned. In orientations 400, 500, 700, and 800, the long axes of adjacent rigid locking teeth disposed in the same row are parallel. In orientations 600 and 900, the long axes of adjacent rigid locking teeth disposed in the same row are not parallel.

In orientations 400, the short axes of adjacent rigid locking teeth disposed in the same row are aligned. In orientations 500, 600, 700, 800, and 900, the short axes of adjacent rigid locking teeth disposed in the same row are not aligned.

Figure 4A:
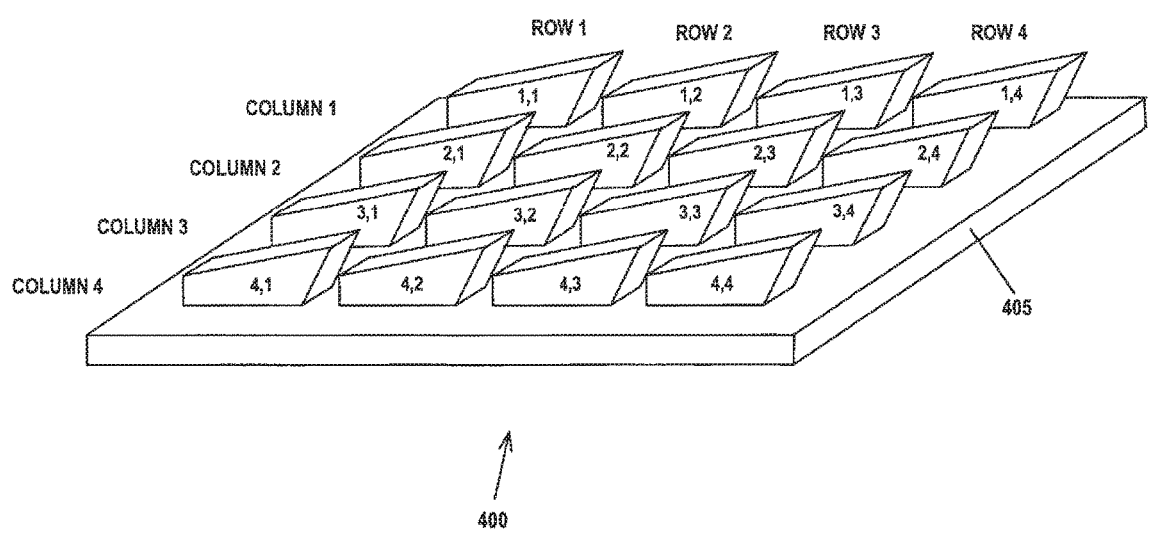
FIG. 4A is a perspective view of a plurality of Applicant's rigid locking teeth arranged in a first orientation.

FIG. 4A shows a portion of plurality of Applicant's rigid locking teeth, such as plurality of rigid locking teeth 104, wherein that plurality of rigid locking teeth comprise orientation 400. In certain embodiments, each of the plurality of rigid locking teeth shown in FIG. 4A comprises a rigid locking tooth 300. In certain embodiments, each of the plurality of rigid locking teeth shown in FIG. 4A comprises a rigid locking tooth 302. In certain embodiments, each of the plurality of rigid locking teeth shown in FIG. 4A comprises a rigid locking tooth 304. In certain embodiments, each of the plurality of rigid locking teeth shown in FIG. 4A comprises a rigid locking tooth 306. In certain embodiments, each of the plurality of rigid locking teeth shown in FIG. 4A is selected from the group consisting of a rigid locking tooth 300, a rigid locking tooth 302, a rigid locking tooth 304, and a rigid locking tooth 306.

In the illustrated embodiment of FIG. 4A, the plurality of rigid locking teeth are arranged in columns and rows, namely columns 1, 2, 3, and 4, and rows 1, 2, 3, and 4. In the illustrated embodiment of FIG. 4A, rigid locking tooth 1,1 for example is disposed in column 1 and row 1. For the sake of clarity, FIG. 4A shows a total of 16 rigid locking teeth. In actual implementation, Applicant's plurality of rigid locking teeth 104 comprises between about one hundred, and about ten thousand individual rigid locking teeth, per square inch.

Figure 4B:
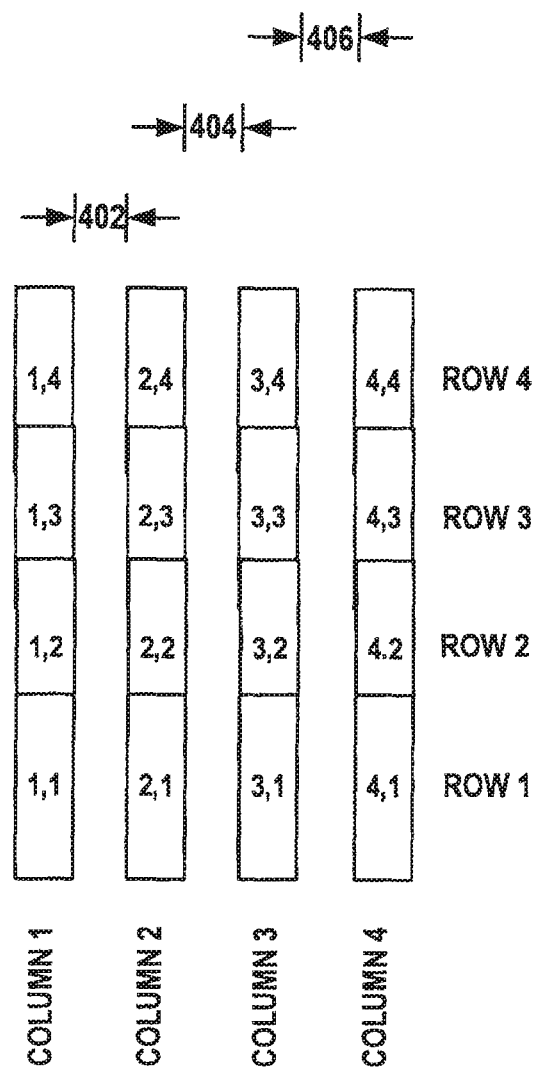
FIG. 4B is a first top view of the plurality of Applicant's rigid locking teeth shown in FIG. 4A.
Figure 4C:
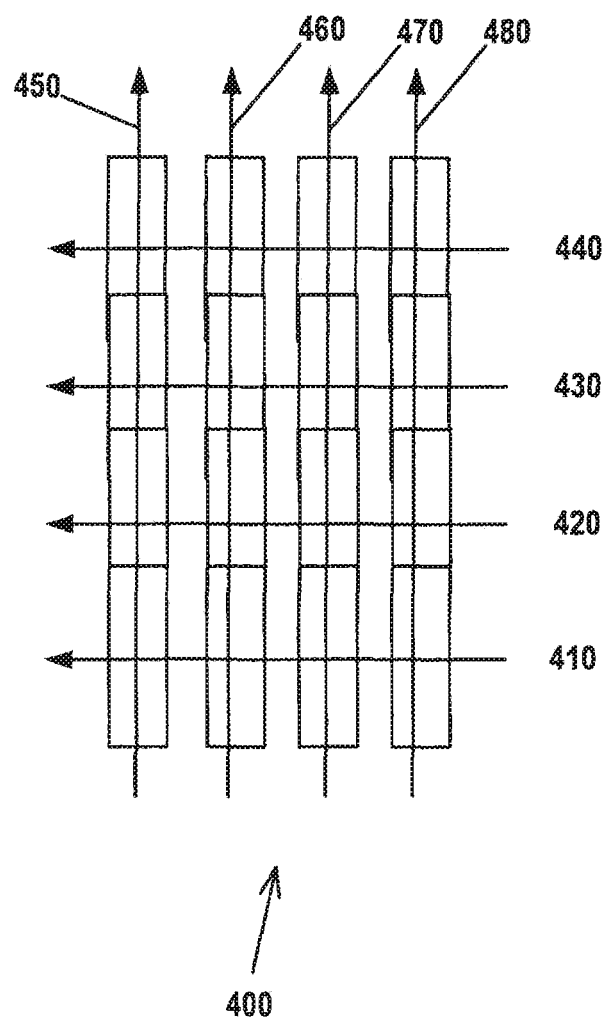
FIG. 4C is a second top view of the plurality of Applicant's rigid locking teeth shown in FIG. 4A.

FIGS. 4B and 4C comprise top views of orientation 400 shown in FIG. 4A. Referring now to FIG. 4B, the rigid locking teeth comprising column 1 are separated from the rigid locking teeth comprising column 2 by a spacing 402. In certain embodiments, spacing 402 is substantially the same as the width 382 (FIG. 3F) of the individual rigid locking teeth. By "substantially the same," Applicant means within plus or minus ten percent (10%). In other embodiments, spacing 402 is less than width 382. In still other embodiments, spacing 402 is greater than width 382.

Similarly, column 2 and 3 are separated by spacing 404, and column 3 and column 4 are separated by spacing 406. In certain embodiments, spacing 404 is substantially the same as the width 382 (FIG. 3F) of the individual rigid locking teeth. In other embodiments, spacing 404 is less than width 382. In still other embodiments, spacing 404 is greater than width 382. In certain embodiments, spacing 406 is substantially the same as the width 382 (FIG. 3F) of the individual rigid locking teeth. In other embodiments, spacing 406 is less than width 382. In still other embodiments, spacing 406 is greater than width 382.

In orientation 400 shown in FIGS. 4A, 4B, and 4C, the long axes 390 of each rigid locking tooth disposed in a column are aligned, and the short axis 395 of each rigid locking tooth disposed in a row are aligned. For example, rigid locking teeth 1,1; 1,2; 1,3; and 1,4; are each disposed in column 1. Aggregate long axis 450 comprises the individual long axis 390 of each of rigid locking teeth 1,1; 1,2; 1,3; and 1,4. Similarly, aggregate long axes 460, 470, and 480, comprise the individual long axis 390 of each rigid locking tooth disposed in columns 2, 3, and 4, respectively.

Rigid locking teeth 1,1; 2,1; 3,1; and 4,1; are disposed in row 1. Aggregate short axis 410 comprises the individual short axis 395 (FIG. 3G) of each of rigid locking teeth 1,1; 2,1; 3,1; and 4,1. Similarly, aggregate short axes 420, 430, and 440, comprise the individual short axis 395 of each tooth disposed in rows 2, 3, and 4, respectively.

Figure 5A:
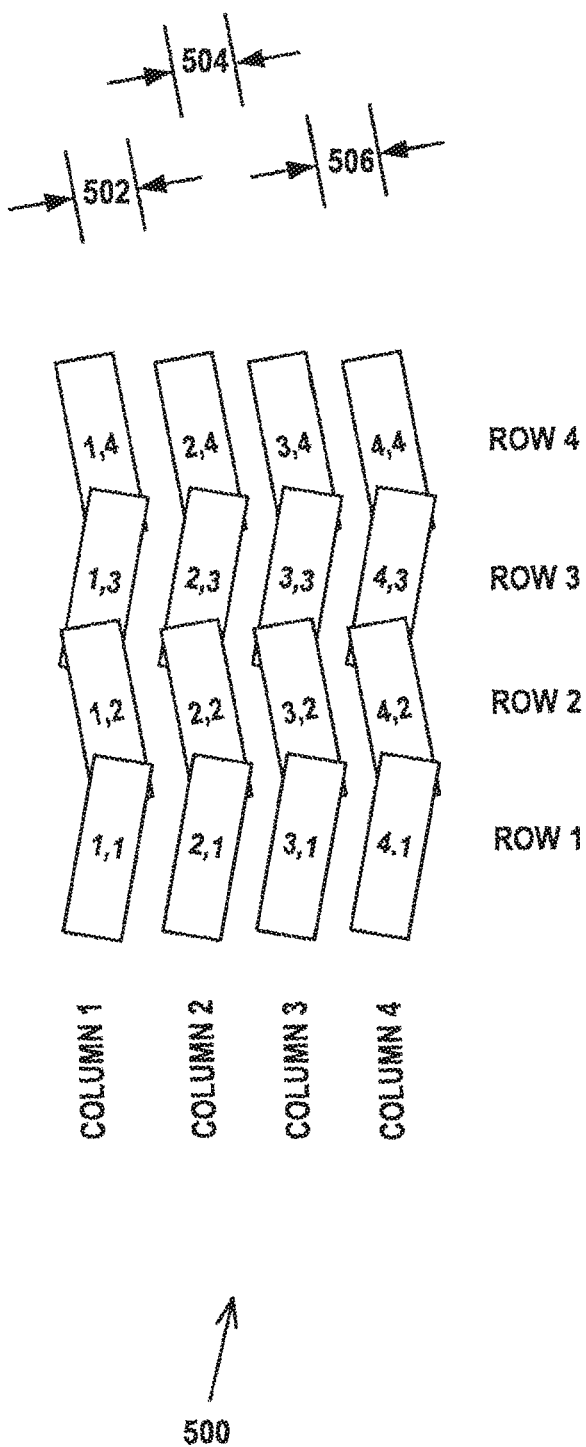
FIG. 5A is a first top view of the plurality of Applicant's rigid locking teeth arranged in a second orientation.

FIG. 5A shows a portion of plurality of Applicant's rigid locking teeth, wherein that plurality of rigid locking teeth comprise orientation 500. In certain embodiments, each of the plurality of rigid locking teeth shown in FIG. 5A comprises a rigid locking tooth 300. In certain embodiments, each of the plurality of rigid locking teeth shown in FIG. 5A comprises a rigid locking tooth 302. In certain embodiments, each of the plurality of rigid locking teeth shown in FIG. 5A comprises a rigid locking tooth 304. In certain embodiments, each of the plurality of rigid locking teeth shown in FIG. 5A comprises a rigid locking tooth 306. In certain embodiments, each of the plurality of rigid locking teeth shown in FIG. 5A is selected from the group consisting of a rigid locking tooth 300, a rigid locking tooth 302, a rigid locking tooth 304, and a rigid locking tooth 306.

In the illustrated embodiment of FIG. 5A, the plurality of rigid locking teeth are arranged in columns and rows, namely columns 1, 2, 3, and 4, and rows 1, 2, 3, and 4. In the illustrated embodiment of FIG. 5A, rigid locking tooth 1,1 for example is disposed in column 1 and row 1. For the sake of clarity, FIG. 5A shows a total of 16 rigid locking teeth.

The rigid locking teeth comprising column 1 are separated from the rigid locking teeth comprising column 2 by a spacing 502. In certain embodiments, spacing 502 is substantially the same as the width 382 (FIG. 3F) of the individual rigid locking teeth. By "substantially the same," Applicant means within plus or minus ten percent (10%). In other embodiments, spacing 502 is less than width 382. In still other embodiments, spacing 502 is greater than width 382.

Similarly, column 2 and 3 are separated by spacing 504, and column 3 and column 4 are separated by spacing 506. In certain embodiments, spacing 504 is substantially the same as the width 382 (FIG. 3F) of the individual rigid locking teeth. In other embodiments, spacing 504 is less than width 382. In still other embodiments, spacing 504 is greater than width 382. In certain embodiments, spacing 506 is substantially the same as the width 382 (FIG. 3F) of the individual rigid locking teeth. In other embodiments, spacing 506 is less than width 382. In still other embodiments, spacing 506 is greater than width 382.

Figure 5B:
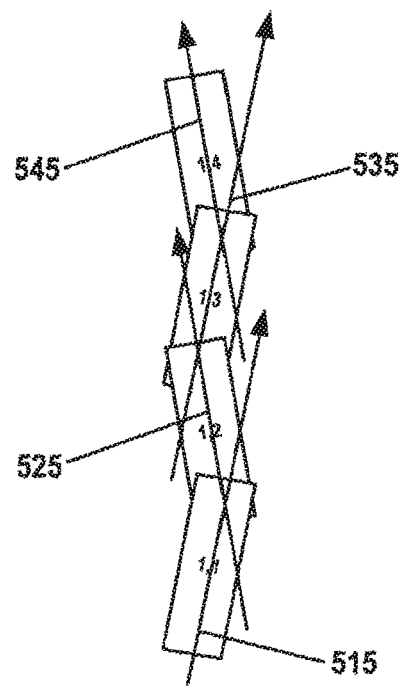
FIG. 5B is a top view of four of Applicant's rigid locking teeth arranged in the orientation of FIG. 5A.
Figure 5C:
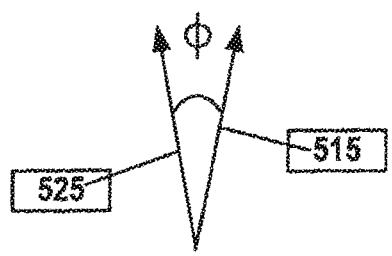
FIG. 5C shows the angle formed by the intersection of the long axes of two adjacent rigid locking teeth in the same column, wherein those rigid locking teeth are arranged in the orientation of FIG. 5A.

FIG. 5B comprises a top view of one column of rigid locking teeth disposed in orientation 500. In orientation 500, the individual long axes 390 (FIG. 3G) of each rigid locking tooth disposed in a column are not aligned. For example, rigid locking tooth 1,1 comprises long axis 515, and the adjacent rigid locking tooth in column 1, namely rigid locking tooth 1,2, comprises long axis 525. As FIGS. 5B and 5C illustrate, long axes 515 and 525 are not aligned. Rather, long axis 525 is offset from long axis 515 by a first offset angle Φ. In certain embodiments, first offset angle Φ is between about 5 degrees and about 45 degrees.

Similarly, long axis 535 is offset from long axis 525 by a second offset angle. In certain embodiments, second offset angle is between about 5 degrees and about 45 degrees. Long axis 545 is offset from long axis 535 by a third offset angle. In certain embodiments, the third offset angle is between about 5 degrees and about 45 degrees. As a general matter, in orientation 500 the long axis for the (i)th rigid locking tooth in (j)th column is offset from the long axis of the adjacent (i+1)th rigid locking tooth in that (j)th column by the (i)th offset angle.

Figure 5D:
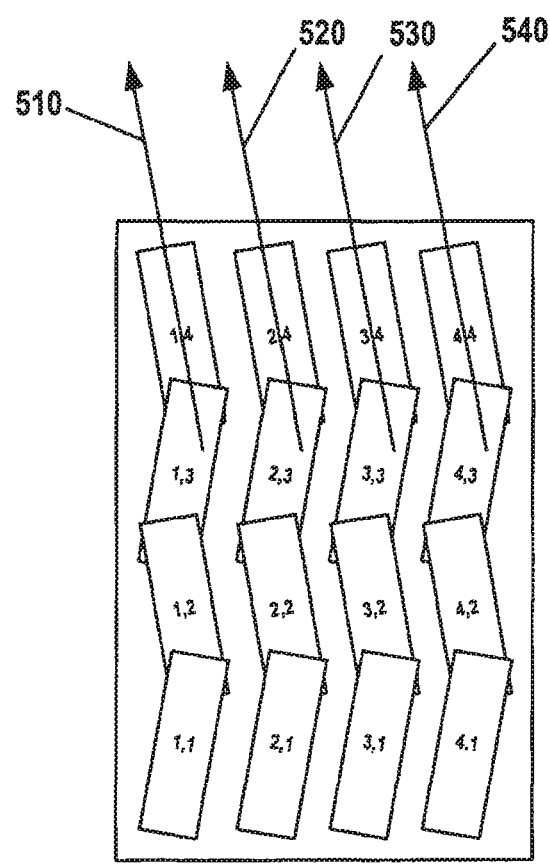
FIG. 5D is a second top view of the plurality of Applicant's rigid locking teeth shown in FIG. 5A.

In orientation 500 illustrated in FIGS. 5A and 5D, the long axes 390 (FIG. 3G) of adjacent rigid locking teeth disposed in the same column are not aligned, however the long axes of the rigid locking teeth in the same row are parallel. Rigid locking teeth 1,4; 2,4; 3,4; and 4,4, are all disposed in row 4, and comprise long axes 510, 520, 530, and 540, respectively. As illustrated in FIG. 5D, long axes 510, 520, 530, and 540, are parallel.

Figure 6A:
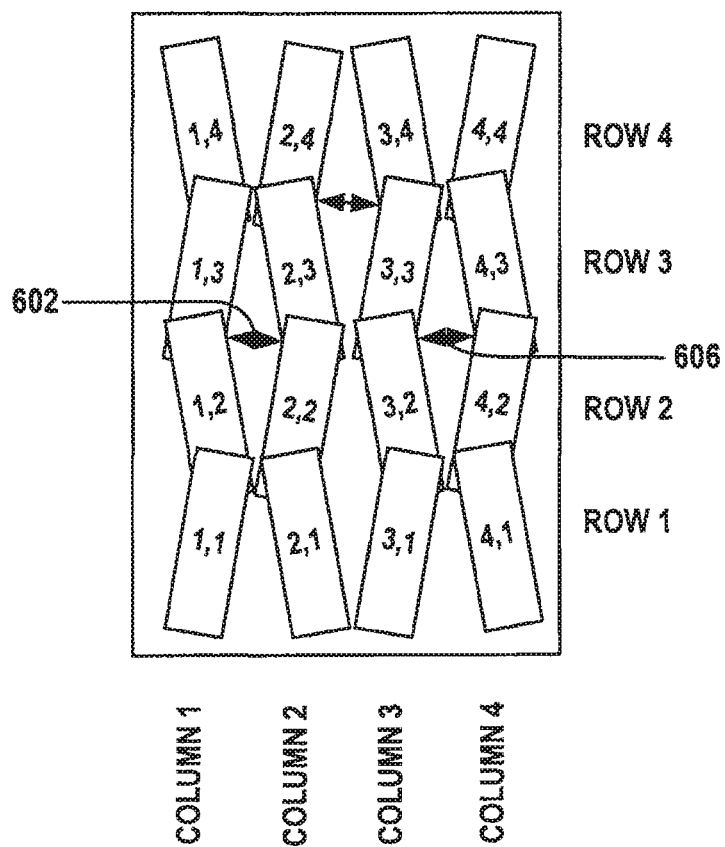
FIG. 6A is a first top view of the plurality of Applicant's rigid locking teeth arranged in a third orientation.

FIG. 6A shows a portion of Applicant's plurality of rigid locking teeth, wherein that plurality of rigid locking teeth comprise orientation 600. In certain embodiments, each of the plurality of rigid locking teeth shown in FIG. 6A comprises a rigid locking tooth 300. In certain embodiments, each of the plurality of rigid locking teeth shown in FIG. 6A comprises a rigid locking tooth 302. In certain embodiments, each of the plurality of rigid locking teeth shown in FIG. 6A comprises a rigid locking tooth 304. In certain embodiments, each of the plurality of rigid locking teeth shown in FIG. 6A comprises a rigid locking tooth 306. In certain embodiments, each of the plurality of rigid locking teeth shown in FIG. 6A is selected from the group consisting of a rigid locking tooth 300, a rigid locking tooth 302, a rigid locking tooth 304, and a rigid locking tooth 306.

In the illustrated embodiment of FIG. 6A, the plurality of rigid locking teeth are arranged in columns and rows, namely columns 1, 2, 3, and 4, and rows 1, 2, 3, and 4. In the illustrated embodiment of FIG. 6A, rigid locking tooth 1,1 for example is disposed in column 1 and row 1. For the sake of clarity, FIG. 6A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a maximum spacing 602. In certain embodiments, maximum spacing 602 is substantially the same as the width 382 (FIG. 3F) of the individual rigid locking teeth. By "substantially the same," Applicant means within plus or minus twenty percent (20%). In other embodiments, maximum spacing 602 is less than width 382. In still other embodiments, maximum spacing 602 is greater than width 382.

Similarly, column 2 and 3 are separated by spacing maximum 604, and column 3 and column 4 are separated by maximum spacing 606. In certain embodiments, maximum spacing 604 is substantially the same as the width 382 (FIG. 3F) of the individual rigid locking teeth. In other embodiments, maximum spacing 604 is less than width 382. In still other embodiments, maximum spacing 604 is greater than width 382. In certain embodiments, maximum spacing 606 is substantially the same as the width 382 (FIG. 3F) of the individual rigid locking teeth. In other embodiments, maximum spacing 606 is less than width 382. In still other embodiments, maximum spacing 606 is greater than width 382.

Figure 6B:
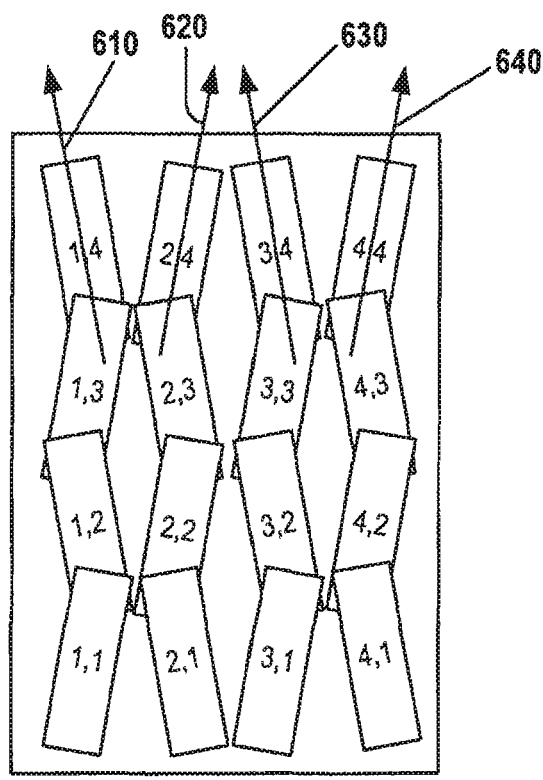
FIG. 6B is a second top view of the plurality of rigid locking teeth shown in FIG. 6A.

In orientation 600 illustrated in FIGS. 6A and 6B, the long axes 390 (FIG. 3G) of adjacent rigid locking teeth disposed in the same column are not aligned. Moreover, the long axes of the rigid locking teeth in the same row are not parallel. Rigid locking teeth 1,4; 2,4; 3,4; and 4,4, are all disposed in row 4, and comprise long axes 610, 620, 630, and 640, respectively. As illustrated in FIG. 6B, long axes 610 is not parallel to long axis 620, which is not parallel to long axis 630, which is not parallel to long axis 640.

Figure 7A:
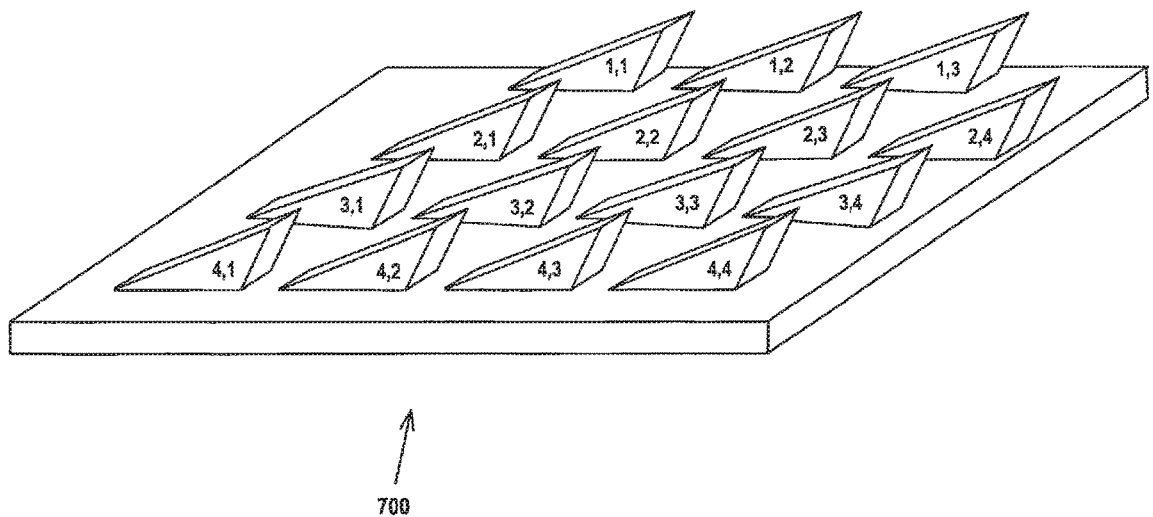
FIG. 7A is a perspective view of Applicant's rigid locking teeth arranged in a fourth orientation.

FIG. 7A shows a portion of Applicant's plurality of rigid locking teeth, wherein that plurality of rigid locking teeth comprise orientation 700. In certain embodiments, each of the plurality of rigid locking teeth shown in FIG. 7A comprises a rigid locking tooth 300. In certain embodiments, each of the plurality of rigid locking teeth shown in FIG. 7A comprises a rigid locking tooth 302. In certain embodiments, each of the plurality of rigid locking teeth shown in FIG. 7A comprises a rigid locking tooth 304. In certain embodiments, each of the plurality of rigid locking teeth shown in FIG. 7A comprises a rigid locking tooth 306. In certain embodiments, each of the plurality of rigid locking teeth shown in FIG. 7A is selected from the group consisting of a rigid locking tooth 300, a rigid locking tooth 302, a rigid locking tooth 304, and a rigid locking tooth 306.

Figure 7B:
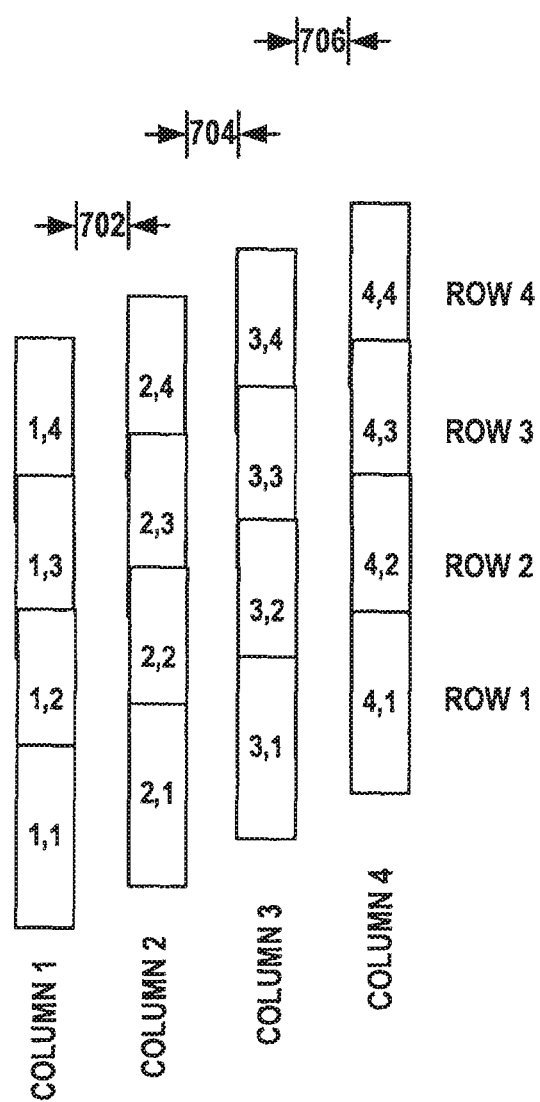
FIG. 7B is a first top view of the plurality of Applicant's rigid locking teeth arranged in the orientation of FIG. 7A.

In the illustrated embodiment of FIG. 7B, the plurality of rigid locking teeth comprising orientation 700 are arranged in columns and rows, namely columns 1, 2, 3, and 4, and rows 1, 2, 3, and 4. In the illustrated embodiment of FIG. 7B, rigid locking tooth 1,1 for example is disposed in column 1 and row 1. For the sake of clarity, FIG. 7B shows a total of 16 rigid locking teeth.

The rigid locking teeth comprising column 1 are separated from the rigid locking teeth comprising column 2 by a spacing 702. In certain embodiments, spacing 702 is substantially the same as the width 382 (FIG. 3F) of the individual rigid locking teeth. By "substantially the same," Applicant means within plus or minus ten percent (10%). In other embodiments, spacing 702 is less than width 382. In still other embodiments, spacing 702 is greater than width 382.

Similarly, column 2 and 3 are separated by spacing 704, and column 3 and column 4 are separated by spacing 706. In certain embodiments, spacing 704 is substantially the same as the width 382 (FIG. 3F) of the individual rigid locking teeth. In other embodiments, spacing 704 is less than width 382. In still other embodiments, spacing 704 is greater than width 382. In certain embodiments, spacing 706 is substantially the same as the width 382 (FIG. 3F) of the individual rigid locking teeth. In other embodiments, spacing 706 is less than width 382. In still other embodiments, spacing 706 is greater than width 382.

Figure 7C:
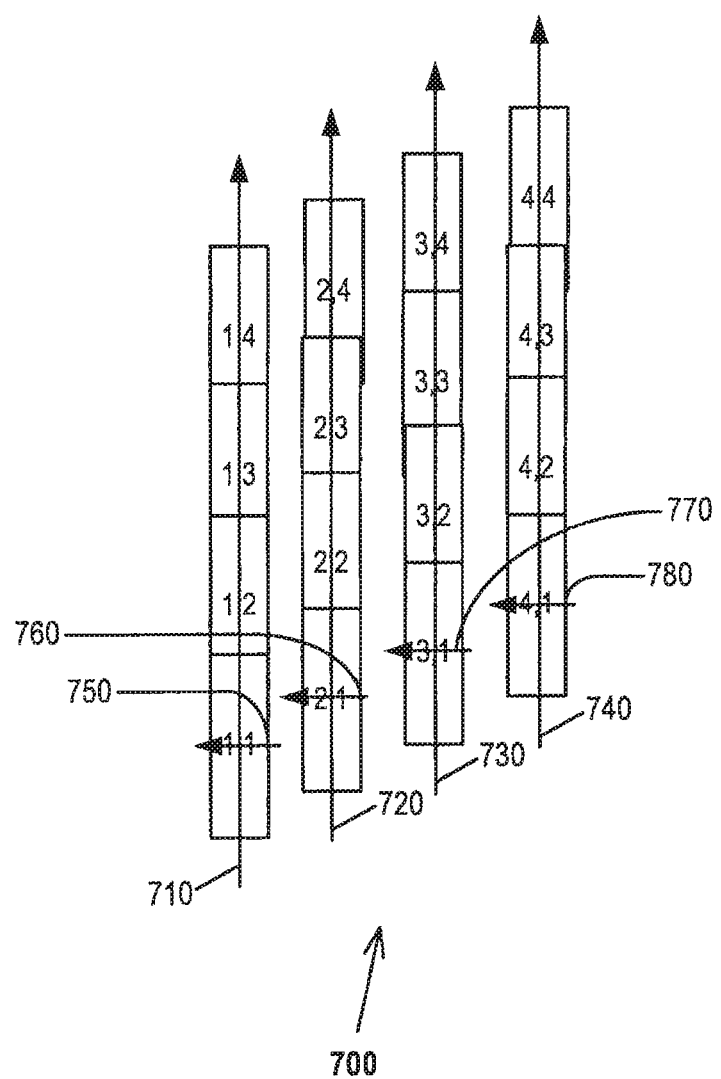
FIG. 7C is a second top view of the plurality of rigid locking teeth shown in FIG. 7A.

In orientation 700 illustrated in FIGS. 7A, 7B, and 7C, the long axes 390 (FIG. 3G) of adjacent rigid locking teeth disposed in the same column are aligned. For example, aggregate long axis 710 comprises the individual long axes 390 (FIG. 3G) of rigid locking teeth 1,1; 1,2; 1,3; and 1,4. Similarly, aggregate long axis 720 comprises the individual long axes 390 (FIG. 3G) of rigid locking teeth 2,1; 2,2; 2,3; and 2,4. Similarly, aggregate long axis 730 comprises the individual long axes 390 (FIG. 3G) of rigid locking teeth 3,1; 3,2; 3,3; and 3,4. Similarly, aggregate long axis 740 comprises the individual long axes 390 (FIG. 3G) of rigid locking teeth 4,1; 2,4; 4,3; and 4,4.

In orientation 700, the short axes 395 (FIG. 3G) of the rigid locking tooth disposed in the same row are not aligned. For example, rigid locking teeth 1,1; 2,1; 3,1; and 4,1, are disposed in row 1. Rigid locking tooth 1,4 comprises short axis 750. Rigid locking tooth 2,4 comprises short axis 760. Rigid locking tooth 3,4 comprises short axis 770. Rigid locking tooth 4,4 comprises short axis 780. In the illustrated embodiment of FIG. 7C, short axis 750 is not aligned with short axis 760, which is not aligned with short axis 770, which is not aligned with short axis 780.

Figure 8A:
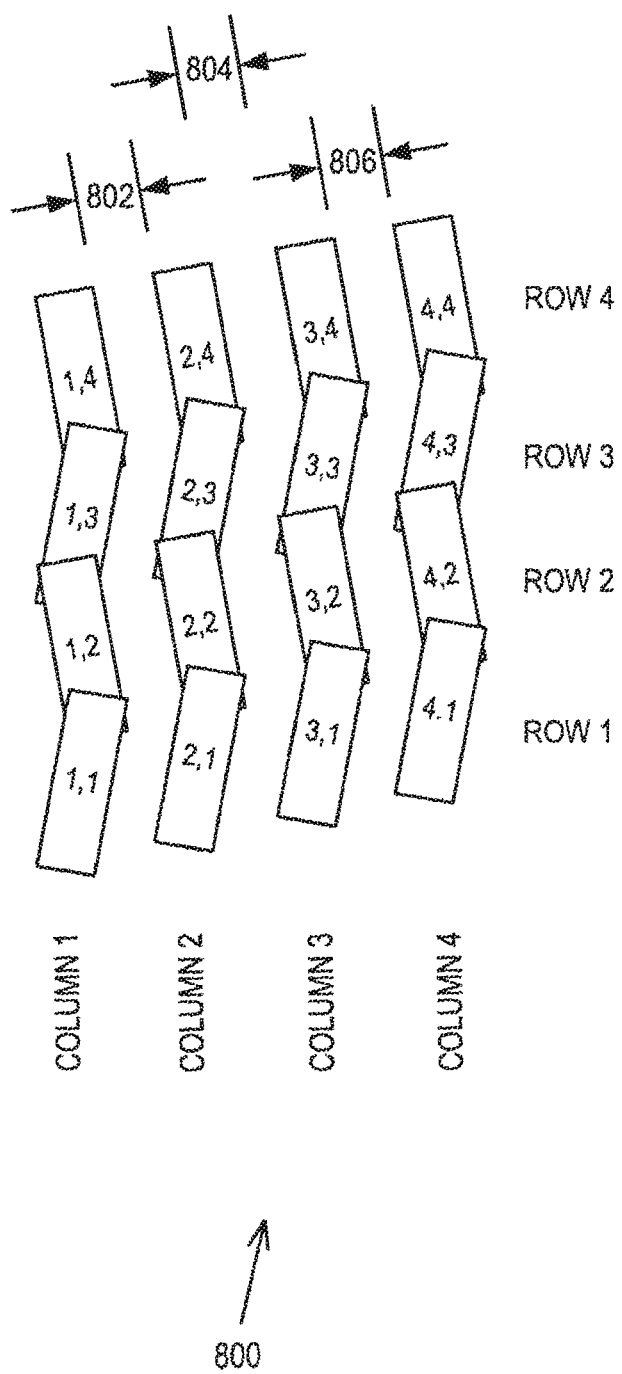
FIG. 8A is a first top view of the plurality of Applicant's rigid locking teeth arranged in a fifth orientation.

FIG. 8A shows a portion of plurality of Applicant's rigid locking teeth, wherein that plurality of rigid locking teeth comprise orientation 800. In certain embodiments, each of the plurality of rigid locking teeth shown in FIG. 8A comprises a rigid locking tooth 300. In certain embodiments, each of the plurality of rigid locking teeth shown in FIG. 8A comprises a rigid locking tooth 302. In certain embodiments, each of the plurality of rigid locking teeth shown in FIG. 8A comprises a rigid locking tooth 304. In certain embodiments, each of the plurality of rigid locking teeth shown in FIG. 8A comprises a rigid locking tooth 306. In certain embodiments, each of the plurality of rigid locking teeth shown in FIG. 8A is selected from the group consisting of a rigid locking tooth 300, a rigid locking tooth 302, a rigid locking tooth 304, and a rigid locking tooth 306.

In the illustrated embodiment of FIG. 8A, the plurality of rigid locking teeth are arranged in columns and rows, namely columns 1, 2, 3, and 4, and rows 1, 2, 3, and 4. In the illustrated embodiment of FIG. 8A, rigid locking tooth 1,1 for example is disposed in column 1 and row 1. For the sake of clarity, FIG. 8A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a spacing 802. In certain embodiments, spacing 802 is substantially the same as the width 382 (FIG. 3F) of the individual rigid locking teeth. By "substantially the same," Applicant means within plus or minus ten percent (10%). In other embodiments, spacing 802 is less than width 382. In still other embodiments, spacing 802 is greater than width 382.

Similarly, column 2 and 3 are separated by spacing 804, and column 3 and column 4 are separated by spacing 806. In certain embodiments, spacing 804 is substantially the same as the width 382 (FIG. 3F) of the individual rigid locking teeth. In other embodiments, spacing 804 is less than width 382. In still other embodiments, spacing 804 is greater than width 382. In certain embodiments, spacing 806 is substantially the same as the width 382 (FIG. 3F) of the individual rigid locking teeth. In other embodiments, spacing 806 is less than width 382. In still other embodiments, spacing 806 is greater than width 382.

Figure 8B:
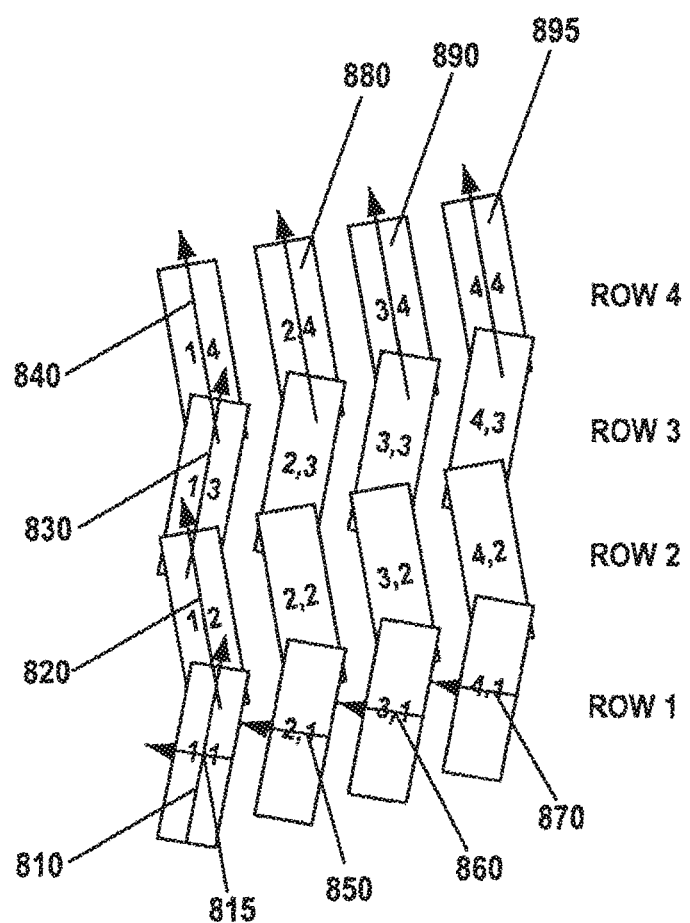
FIG. 8B is a second top view of the plurality of rigid locking teeth shown in FIG. 8A.

In orientation 800 illustrated in FIGS. 8A and 8B, the long axes 390 (FIG. 3G) of adjacent rigid locking teeth disposed in the same column are not aligned. For example, rigid locking teeth 1,1; 1,2; 1,3; and 1,4; comprise long axes 810, 820, 830, and 840, respectively. Long axis 810 is not aligned with long axis 820, which is not aligned with long axis 830, which is not aligned with long axis 840.

In orientation 800, the long axes of the rigid locking teeth in the same row are parallel. Rigid locking teeth 1,4; 2,4; 3,4; and 4,4, are all disposed in row 4, and comprise long axes 840, 880, 890, and 895, respectively. As illustrated in FIG. 8B, long axes 840, 880, 890, and 895, are parallel to one another.

In orientation 800, the short axes 395 (FIG. 3G) of the rigid locking tooth disposed in the same row are not aligned. For example, the rigid locking teeth 1,1; 2,1; 3,1; and 4,1; comprise short axis 815, 850, 860, and 870, respectively, wherein axis 815 is not aligned with axis 850, which is not aligned with axis 860, which is not aligned with axis 870.

Figure 9A:
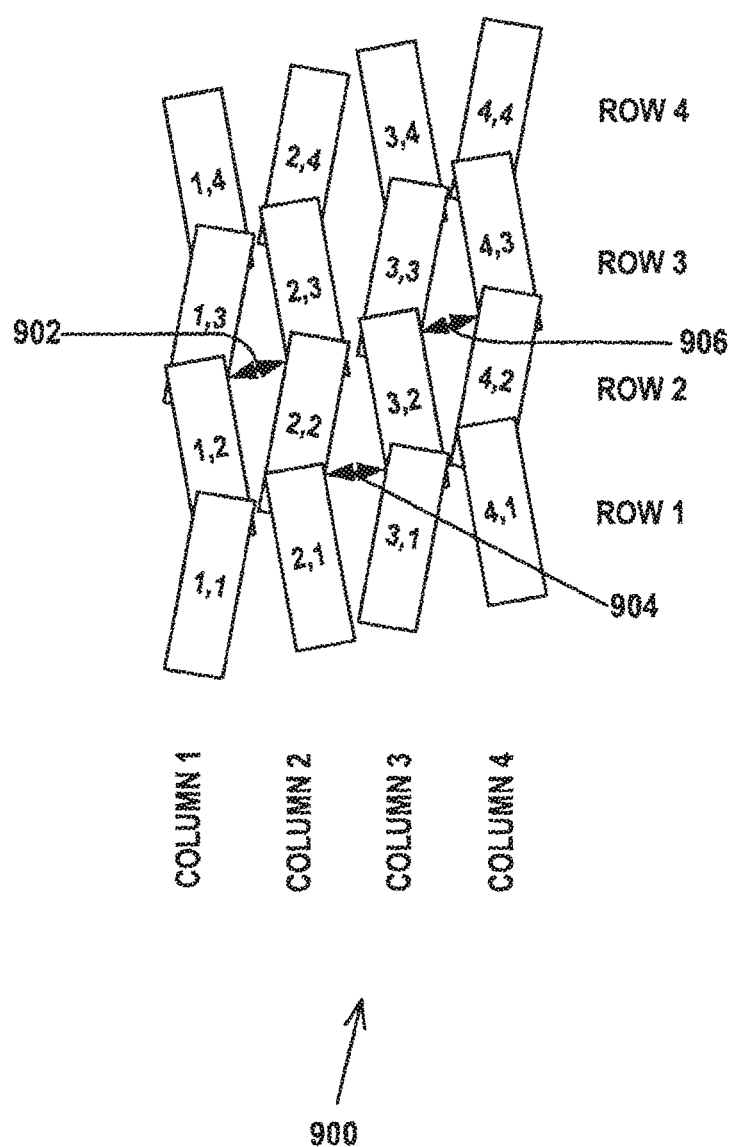
FIG. 9A is a first top view of the plurality of Applicant's rigid locking teeth arranged in a sixth orientation.

FIG. 9A shows a portion of plurality of Applicant's rigid locking teeth, wherein that plurality of rigid locking teeth comprises orientation 900. In certain embodiments, each of the plurality of rigid locking teeth shown in FIG. 9A comprises a rigid locking tooth 300. In certain embodiments, each of the plurality of rigid locking teeth shown in FIG. 9A comprises a rigid locking tooth 302. In certain embodiments, each of the plurality of rigid locking teeth shown in FIG. 9A comprises a rigid locking tooth 304. In certain embodiments, each of the plurality of rigid locking teeth shown in FIG. 9A comprises a rigid locking tooth 306. In certain embodiments, each of the plurality of rigid locking teeth shown in FIG. 9A is selected from the group consisting of a rigid locking tooth 300, a rigid locking tooth 302, a rigid locking tooth 304, and a rigid locking tooth 306.

In the illustrated embodiment of FIG. 9A, the plurality of rigid locking teeth are arranged in columns and rows, namely columns 1, 2, 3, and 4, and rows 1, 2, 3, and 4. In the illustrated embodiment of FIG. 9A, rigid locking tooth 1,1 for example is disposed in column 1 and row 1. For the sake of clarity, FIG. 9A shows a total of 16 rigid locking teeth. In actual implementation, Applicant's plurality of rigid locking teeth 104 comprises between about one hundred, and about ten thousand individual rigid locking teeth.

The rigid locking teeth comprising column 1 are separated from the rigid locking teeth comprising column 2 by a maximum spacing 902. In certain embodiments, maximum spacing 902 is substantially the same as the width 382 (FIG. 3F) of the individual rigid locking teeth. By "substantially the same," Applicant means within plus or minus ten percent (10%). In other embodiments, maximum spacing 902 is less than width 382. In still other embodiments, maximum spacing 902 is greater than width 382.

Similarly, column 2 and 3 are separated by spacing maximum 904, and column 3 and column 4 are separated by maximum spacing 906. In certain embodiments, maximum spacing 904 is substantially the same as the width 382 (FIG. 3F) of the individual rigid locking teeth. In other embodiments, maximum spacing 904 is less than width 382. In still other embodiments, maximum spacing 904 is greater than width 382. In certain embodiments, maximum spacing 906 is substantially the same as the width 382 (FIG. 3F) of the individual rigid locking teeth. In other embodiments, maximum spacing 906 is less than width 382. In still other embodiments, maximum spacing 906 is greater than width 382.

Figure 9B:
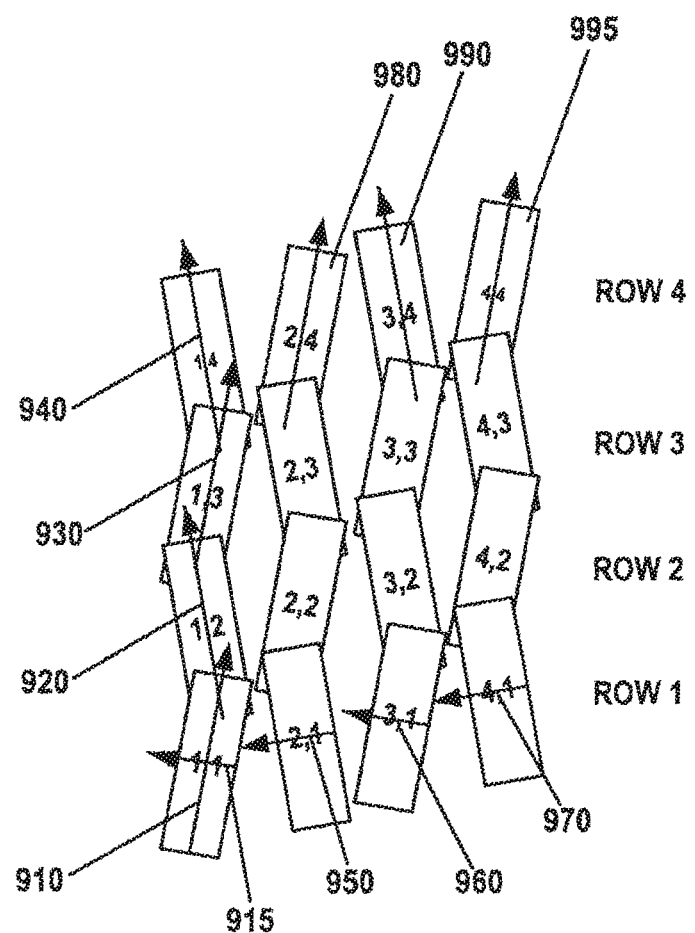
FIG. 9B is a second top view of the plurality of rigid locking teeth shown in FIG. 9A.

In orientation 900 illustrated in FIGS. 9A and 9B, the long axes 390 (FIG. 3G) of adjacent rigid locking teeth disposed in the same column are not aligned. For example, rigid locking teeth 1,1; 1,2; 1,3; and 1,4; comprise long axes 910, 920, 930, and 940, respectively. Long axis 910 is not aligned with long axis 920, which is not aligned with long axis 930, which is not aligned with long axis 940.

In orientation 900, the long axes of the rigid locking teeth in the same row are not parallel. Rigid locking teeth 1,4; 2,4; 3,4; and 4,4, are all disposed in row 4, and comprise long axes 940, 980, 990, and 995, respectively. As illustrated in FIG. 8B, long axis 940 is not parallel with long axis 980, which is not parallel with long axis 990, which is not parallel with long axis 995. Alternate long axes, such as long axes 940 and 990 and long axes 980 and 995, are parallel to one another.

In orientation 900, the short axes 395 (FIG. 3G) of the rigid locking teeth disposed in the same row are not aligned. For example, the rigid locking teeth 1,1; 2,1; 3,1; and 4,1; comprise short axis 915, 950, 960, and 970, respectively, wherein axis 915 is not aligned with axis 950, which is not aligned with axis 960, which is not aligned with axis 970.

Now referring to the illustrated embodiments of FIGS. 10A-10C again, RFID enhanced fixturing apparatus 1200 is disclosed. The fixturing apparatus 1200 further comprises a radio-frequency identification (RFID) chip 1000. Radio-frequency identification (RFID) uses electromagnetic fields to automatically identify and track tags/chips attached to objects. The tags/chips contain electronically stored information. Passive tags/chips collect energy from a nearby RFID reader's interrogating radio waves. Active tags/chips have a local power source (such as a battery) and may operate hundreds of meters from the RFID reader. Unlike a barcode, the RFID tag/chip need not be within the line of sight of the RFID reader, so it may be embedded in the tracked object, such as the fixturing apparatus 100 or the flexible strap 200. In some embodiments, the RFID chip is an OMNI-ID FIT 400P RFID tag. Any suitable RFID chip that can enable accurate identification and tracking and can securely attach to the fixturing apparatus 100 and the flexible strap 200 may be utilized here.

When the fixturing apparatus 100 and the flexible strap 200 are attached to cables, the RFID chip 1000 allows identification, tracking, and sorting of the cables. To prevent separation of RFID chip 1000 from the RFID enhanced fixturing apparatus 1200, it is advantageous to securely and permanently attach RFID chip 1000 to the fixturing apparatus 100 or the flexible strap 200.

Referring to FIG. 10A, in some embodiments, the RFID chip 1000 can be enclosed in the bottom 105 (FIG. 3C) of the subassembly 102B. This enclosure can be achieved by embedding RFID chip 1000 in the injection molded subassembly 102B. Further, the RFID chip can be attached to bottom 105 by adhesives, ultrasonic welding, and other known methods in the art. Moreover, a barcode can be sketched either on the subassembly 102A or 102B. In other embodiments, referring to FIG. 10B, the RFID chip 1000 can be embedded in between the first segment 203 and the second segment 204. In yet other embodiments, referring to FIG. 10C, the RFID chip 1000 can be attached to the pull tag 206. The attachments can be done by adhesives, sewing, ultrasonic welding, or other suitable methods known in the art.

While the preferred embodiments of the present disclosure have been illustrated in detail, it should be apparent that modifications and adaptations to those embodiments may occur to one skilled in the art without departing from the scope of the present invention as set forth herein.

I claim:

1. A RFID enhanced fixturing apparatus comprising:
   a housing defining an interior space and comprising a trapezoidal cross-section, a first end, and an opposing second end, and is formed to include an aperture extending therethrough from the first end to said second end;
   a first plurality of locking teeth disposed within said aperture;
   a second plurality of locking teeth disposed within said aperture;
   a flexible fabric strap comprising a first end attached to the housing, an opposing second end, and a pull tag attached to the second end; and
   a radio-frequency identification (RFID) chip coupled to the RFID enhanced fixturing apparatus.

2. The RFID enhanced fixturing apparatus of claim 1, wherein said housing comprises a first and a second assembly, each assembly comprising a bottom, a first lip extending outwardly from said bottom, an opposing second lip extending outwardly from said bottom, a first side wall extending outwardly from said bottom and connecting a first end of said first lip and a first end of said second lip, a second side wall extending outwardly from said bottom and connecting a second end of said first lip and a second end of said second lip, and said plurality of locking teeth extending outwardly from said bottom, wherein said plurality of locking teeth are disposed between said first lip, said second lip, said first side, and said second side;
   wherein:
   said first side wall and said second side wall comprise a first height where said first side wall and said second side wall are attached to said first lip;
   said first side wall and said second side wall comprise a second height where said first side wall and said second side wall are attached to said second lip;

each of said first plurality of locking teeth and each of said second plurality of locking teeth comprise a third height;

said third height is less than first height;

said third height is less than said second height; and said first assembly is attached to said second assembly to form said housing.

3. The RFID enhanced fixturing apparatus of claim 2, wherein:

each first lip and each second lip comprises a fourth height; and said first height, said second height, and said third height are greater than said fourth height.

4. The RFID enhanced fixturing apparatus of claim 1, wherein the flexible fabric strap further comprises a first segment and a second segment, wherein:

the first segment comprise a first surface, an opposing second surface, a first end attached to the housing, and an opposing second end, wherein a first plurality of loop-type fasteners are disposed on said first surface;

the second segment comprises a first surface, an opposing second surface, a first end, and an opposing second end attached to the pull tag; and the second end of the first segment is attached to the first end of the second segment to form the flexible fabric strap.

5. The RFID enhanced fixturing apparatus of claim 1, wherein the RFID chip is attached to a bottom of either the first assembly or the second assembly.

6. The RFID enhanced fixturing apparatus of claim 1, wherein the RFID chip is enclosed in a bottom of either the first assembly or the second assembly.

7. The RFID enhanced fixturing apparatus of claim 1, wherein the RFID chip is embedded between the second end of the first segment and the first end of the second segment.

8. The RFID enhanced fixturing apparatus of claim 1, wherein the RFID chip is attached to the pull tag.

9. The RFID enhanced fixturing apparatus of claim 4, further comprising a second plurality of loop-type fasteners disposed on the second surface of the second segment.

10. The RFID enhanced fixturing apparatus of claim 9, wherein the second end of the flexible fabric strap can be inserted into the first end of the aperture, and moved in a first direction through the aperture and outwardly from the housing through second end of said aperture; and after insertion in and through the aperture in the first direction, the flexible strap cannot be moved backwardly through the aperture in a second and 180 degree opposite direction when the first plurality of loop-type fasteners are engaged with the plurality of locking teeth.

* * * * *